(12) United States Patent　　　　(10) Patent No.: US 12,592,401 B2
　　Yamazaki et al.　　　　　　　　(45) Date of Patent: Mar. 31, 2026

(54) INFORMATION PROCESSING DEVICE AND VEHICLE

(71) Applicant: HONDA MOTOR CO., LTD., Tokyo (JP)

(72) Inventors: Keiko Yamazaki, Saitama (JP); Ryu Okano, Saitama (JP); Akane Goto, Saitama (JP); Yuichi Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 488 days.

(21) Appl. No.: 18/129,512

(22) Filed: Mar. 31, 2023

(65) Prior Publication Data

US 2023/0317982 A1　　Oct. 5, 2023

(30) Foreign Application Priority Data

Mar. 31, 2022　(JP) ................................. 2022-060203

(51) Int. Cl.
　　*H01M 8/04*　　　(2016.01)
　　*H01M 8/04007*　(2016.01)
　　*H01M 8/0432*　　(2016.01)
(52) U.S. Cl.
　　CPC ..... *H01M 8/04067* (2013.01); *H01M 8/0432* (2013.01)
(58) Field of Classification Search
　　CPC ........................ H01M 8/04067; H01M 8/0432
　　See application file for complete search history.

(56) References Cited

U.S. PATENT DOCUMENTS

| | | |
|---|---|---|
| 2013/0065150 A1 | 3/2013 | Matsusue |
| 2015/0125772 A1 | 5/2015 | Matsusue et al. |
| 2018/0215283 A1* | 8/2018 | Matsusue ................ B60L 58/40 |

FOREIGN PATENT DOCUMENTS

| | | |
|---|---|---|
| JP | 2011-243477 A | 12/2011 |
| WO | WO 2013/128610 A1 | 9/2013 |

* cited by examiner

*Primary Examiner* — Olatunji A Godo
(74) *Attorney, Agent, or Firm* — Paratus Law Group, PLLC

(57) ABSTRACT

An information processing device includes an acquisition unit which acquires use history information indicating a use history of a vehicle for a plurality of items, a derivation unit which derives the output decrease amount for each of the items based on use history information and output decrease characteristic information, a factor-specific output decrease amount estimation unit which estimates the output decrease amount for each of output decrease factors based on the output decrease amount for each of the items and output decrease factor information, and a control unit which executes control to increase a flow rate of a pump when any one of output decrease amounts for each of the output decrease factors is equal to or larger than a threshold value, compared with when where all of the output decrease amounts for each of the output decrease factors are less than the threshold value.

12 Claims, 13 Drawing Sheets

FIG. 5

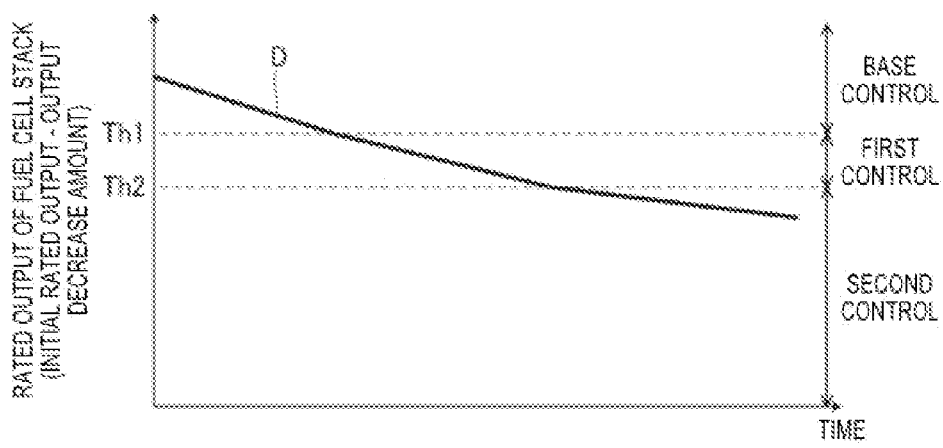

FIG. 6

| CONTROL | | BASE CONTROL | FIRST CONTROL | SECOND CONTROL |
|---|---|---|---|---|
| EXECUTION CONDITION | | RATED OUTPUT > FIRST THRESHOLD VALUE Th1 | SECOND THRESHOLD VALUE Th2 < RATED OUTPUT ≤ FIRST THRESHOLD VALUE Th1 | RATED OUTPUT ≤ SECOND THRESHOLD VALUE Th2 |
| FLOW RATE OF REFRIGERANT PUMP | DURING LOW-LOAD POWER GENERATION | FIRST FLOW RATE MAP | FIRST FLOW RATE MAP | SECOND FLOW RATE MAP |
| | DURING HIGH-LOAD POWER GENERATION | FIRST FLOW RATE MAP | SECOND FLOW RATE MAP | SECOND FLOW RATE MAP |

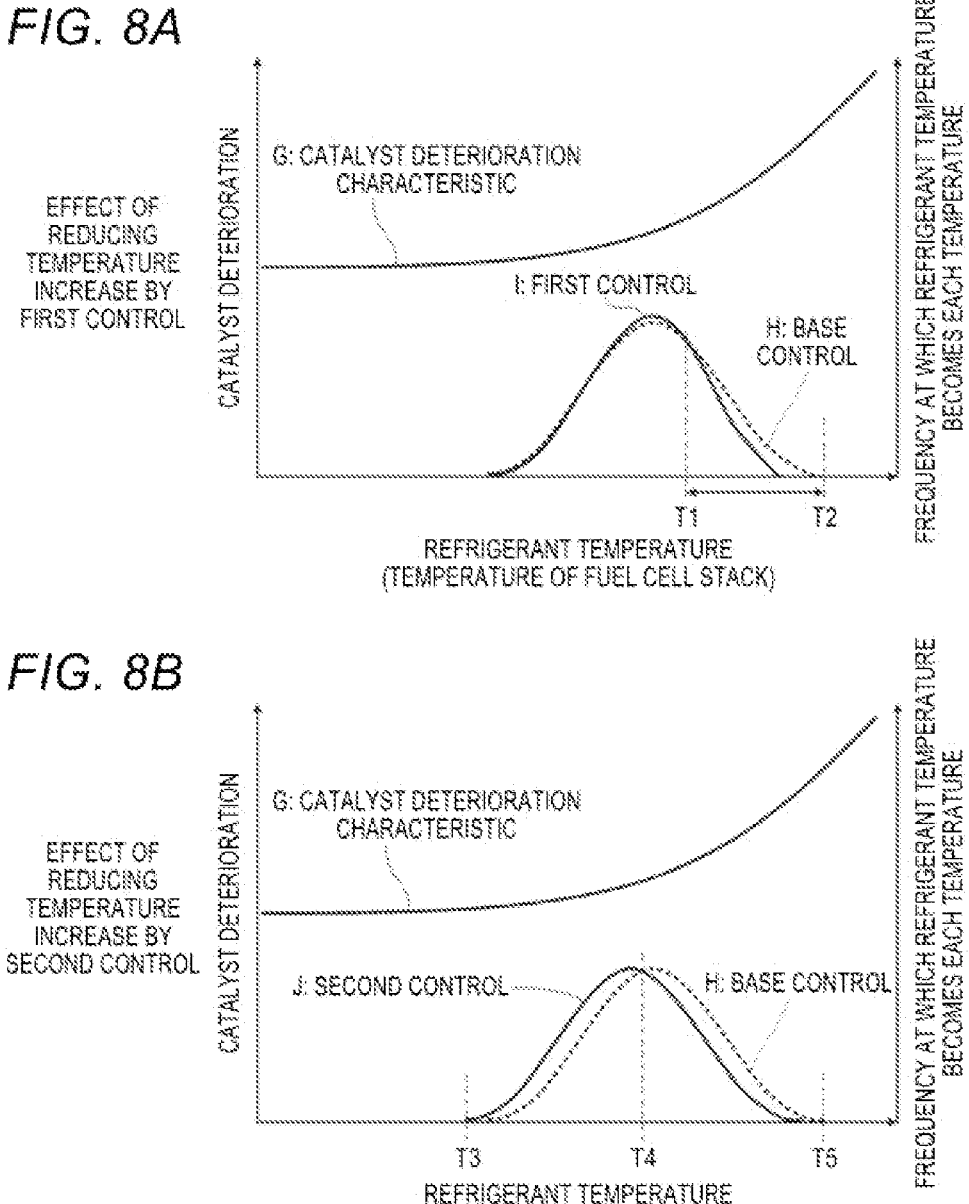

FIG. 8A

EFFECT OF
REDUCING
TEMPERATURE
INCREASE BY
FIRST CONTROL

CATALYST DETERIORATION

G: CATALYST DETERIORATION
CHARACTERISTIC

I: FIRST CONTROL

H: BASE
CONTROL

T1     T2

REFRIGERANT TEMPERATURE
(TEMPERATURE OF FUEL CELL STACK)

FREQUENCY AT WHICH REFRIGERANT TEMPERATURE
BECOMES EACH TEMPERATURE

FIG. 8B

EFFECT OF
REDUCING
TEMPERATURE
INCREASE BY
SECOND CONTROL

CATALYST DETERIORATION

G: CATALYST DETERIORATION
CHARACTERISTIC

J: SECOND CONTROL

H: BASE CONTROL

T3     T4     T5

REFRIGERANT TEMPERATURE
(TEMPERATURE OF FUEL CELL STACK)

FREQUENCY AT WHICH REFRIGERANT TEMPERATURE
BECOMES EACH TEMPERATURE

Figure 9:
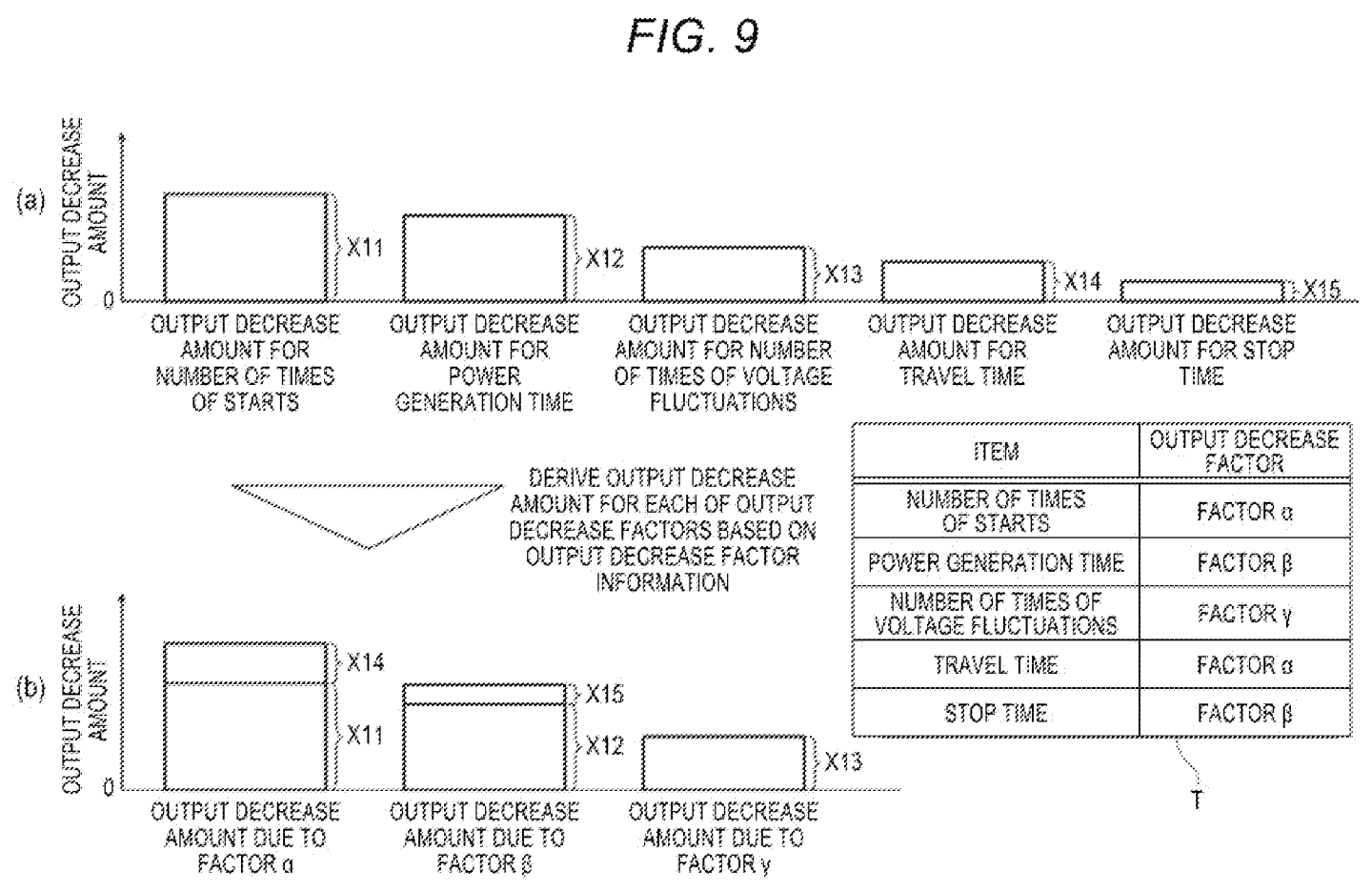

| ITEM | OUTPUT DECREASE FACTOR |
|---|---|
| NUMBER OF TIMES OF STARTS | FACTOR α |
| POWER GENERATION TIME | FACTOR β |
| NUMBER OF TIMES OF VOLTAGE FLUCTUATIONS | FACTOR γ |
| TRAVEL TIME | FACTOR α |
| STOP TIME | FACTOR β |

T

OUTPUT DECREASE AMOUNT

0

OUTPUT DECREASE AMOUNT FOR NUMBER OF TIMES OF STARTS — X11

OUTPUT DECREASE AMOUNT FOR POWER GENERATION TIME — X12

OUTPUT DECREASE AMOUNT FOR NUMBER OF TIMES OF VOLTAGE FLUCTUATIONS — X13

OUTPUT DECREASE AMOUNT FOR TRAVEL TIME — X14

OUTPUT DECREASE AMOUNT FOR STOP TIME — X15

DERIVE OUTPUT DECREASE AMOUNT FOR EACH OF OUTPUT DECREASE FACTORS BASED ON OUTPUT DECREASE FACTOR INFORMATION (b)

OUTPUT DECREASE AMOUNT

0

OUTPUT DECREASE AMOUNT DUE TO FACTOR α — X14, X11

OUTPUT DECREASE AMOUNT DUE TO FACTOR β — X15, X12

OUTPUT DECREASE AMOUNT DUE TO FACTOR γ — X13

*FIG. 12*

```
┌─────────────────────────────────┐
│  FACTOR-SPECIFIC DETERMINATION  │──S8
│           PROCESSING            │
└─────────────────────────────────┘
                 │
                 ▼
┌─────────────────────────────────┐
│  DERIVE OUTPUT DECREASE AMOUNT FOR │──S11
│  EACH OF OUTPUT DECREASE FACTORS │
└─────────────────────────────────┘
                 │
                 ▼
          ╱────────────────────────────────────╲  S12
   NO    ╱ OUTPUT DECREASE AMOUNT FOR ANY ONE OF OUTPUT ╲
 ◀──────◁  DECREASE FACTORS ≥ FOURTH THRESHOLD VALUE?   ▷
 │        ╲────────────────────────────────────╱
 │                      │ YES
 │                      ▼                        S14
 │        ╱────────────────────────────────────╲
 │       ╱ OUTPUT DECREASE AMOUNT FOR ANY ONE OF OUTPUT ╲  YES
 │      ◁  DECREASE FACTORS ≥ FIFTH THRESHOLD VALUE?    ▷──────┐
 │ S13   ╲────────────────────────────────────╱              │ S16
 │                      │ NO                                  │
 ▼                      ▼                                     ▼
┌──────────┐     ┌─────────────────┐              ┌──────────┐
│   BASE   │     │  FIRST CONTROL ON │──S15         │  SECOND  │
│ CONTROL ON│     └─────────────────┘              │ CONTROL ON│
└──────────┘                                        └──────────┘
      │                  │                                │
      └──────────────────┼────────────────────────────────┘
                         ▼
                    ⬭ END ⬭
```

*FIG. 13*

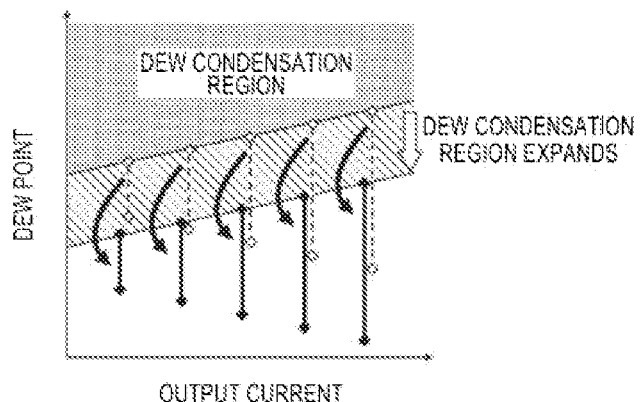

HUMIDITY RANGE CORRESPONDING TO EACH
OUTPUT CURRENT WHEN TEMPERATURE OF
REFRIGERANT IS NOT DECREASED

HUMIDITY RANGE CORRESPONDING TO EACH
OUTPUT CURRENT WHEN TEMPERATURE OF
REFRIGERANT IS DECREASED

INFORMATION PROCESSING DEVICE AND VEHICLE

CROSS-REFERENCE TO RELATED APPLICATION

The present application claims priority from Japanese Patent Application No. 2022-060203 filed on Mar. 31, 2022, the entire content of which is incorporated herein by reference.

TECHNICAL FIELD

The present invention relates to an information processing device and a vehicle including the information processing device.

BACKGROUND ART

In recent years, researches and development on a fuel cell that contributes to efficiency of energy have been carried out to ensure access to affordable, reliable, sustainable, and modern energy for more people. In recent years, as one of efforts for implementing a low-carbon society or a decarbonization society, a fuel cell electric vehicle including a fuel cell as a power source and a drive source driven by electric power of the fuel cell has been developed (for example, see JP2011-243477A and WO2013/128610).

The fuel cell deteriorates as the fuel cell is used, and a rated output gradually decreases. Therefore, in a fuel cell system including a fuel cell as a power source of a fuel cell electric vehicle or the like, it is desirable to execute control in consideration of a degree of deterioration of the fuel cell.

SUMMARY

The present invention provides an information processing device and a vehicle capable of ensuring an output of a fuel cell while reducing deterioration of the fuel cell.

According to a first aspect of the present invention, there is provided an information processing device for predicting an output decrease amount of a fuel cell in a vehicle including the fuel cell and a drive source driven by electric power of the fuel cell. The information processing device includes an acquisition unit configured to acquire use history information indicating a use history of the vehicle for a plurality of items related to an output decrease of the fuel cell, a derivation unit configured to derive the output decrease amount for each of the items based on use history information acquired by the acquisition unit and output decrease characteristic information indicating an output decrease characteristic of the fuel cell for each of the items, a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items, and a control unit configured to execute predetermined control based on the output decrease amount for each of the output decrease factors estimated by the factor-specific output decrease amount estimation unit. The control unit executes control to increase a flow rate of a pump for supplying a refrigerant to the fuel cell when any one of output decrease amounts for each of the output decrease factors is equal to or larger than a threshold value, compared with when all of the output decrease amounts for each of the output decrease factors are less than the threshold value.

According to a second aspect of the present invention, there is provided an information processing device for predicting an output decrease amount of a fuel cell in a vehicle including the fuel cell and a drive source driven by electric power of the fuel cell. The information processing device includes an acquisition unit configured to acquire use history information indicating a use history of the vehicle for a plurality of items related to an output decrease of the fuel cell, a derivation unit configured to derive the output decrease amount for each of the items based on use history information acquired by the acquisition unit and output decrease characteristic information indicating an output decrease characteristic of the fuel cell for each of the items, a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items, and a control unit configured to execute predetermined control based on the output decrease amount for each of the output decrease factors estimated by the factor-specific output decrease amount estimation unit. The control unit executes control to decrease a target temperature of the refrigerant that cools the fuel cell used for control of a cooling device in which the refrigerant circulates when any one of the output decrease amounts for each of the output decrease factors is equal to or larger than a threshold value, compared with when all of the output decrease amounts for each of the output decrease factors are less than the threshold value.

According to a third aspect of the present invention, there is provided a vehicle including the information processing device according to the first aspect and the second aspect of the present invention, the fuel cell, and the drive source.

According to a fourth aspect of the present invention, there is provided an information processing device for predicting an output decrease amount of a fuel cell in a fuel cell system including the fuel cell. The information processing device includes an acquisition unit configured to acquire use history information indicating a use history of the fuel cell system for a plurality of items related to an output decrease of the fuel cell, a derivation unit configured to derive the output decrease amount for each of the items based on use history information acquired by the acquisition unit and output decrease characteristic information indicating an output decrease characteristic of the fuel cell for each of the items, a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items, and a control unit configured to execute predetermined processing based on the output decrease amount for each of the output decrease factors estimated by the factor-specific output decrease amount estimation unit. The control unit executes control to increase a flow rate of a pump for supplying a refrigerant to the fuel cell when any one of the output decrease amounts for each of the output decrease factors is equal to or larger than a threshold value, compared with when all of the output decrease amounts for each of the output decrease factors are less than the threshold value.

According to a fifth aspect of the present invention, there is provided an information processing device for predicting an output decrease amount of a fuel cell in a fuel cell system including the fuel cell. The information processing device includes an acquisition unit configured to acquire use history information indicating a use history of the fuel cell system for a plurality of items related to an output decrease of the fuel cell, a derivation unit configured to derive the output decrease amount for each of the items based on use history information acquired by the acquisition unit and output decrease characteristic information indicating an output decrease characteristic of the fuel cell for each of the items, a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items, and a control unit configured to execute predetermined processing based on the output decrease amount for each of the output decrease factors estimated by the factor-specific output decrease amount estimation unit. The control unit executes control to decrease a target temperature of the refrigerant that cools the fuel cell used for control of a cooling device in which the refrigerant circulates when any one of the output decrease amounts for each of the output decrease factors is equal to or larger than a threshold value, compared with when all of the output decrease amounts for each of the output decrease factors are less than the threshold value.

According to the present invention, it is possible to provide the information processing device and the vehicle capable of ensuring an output of the fuel cell while reducing deterioration of the fuel cell.

BRIEF DESCRIPTION OF DRAWINGS

FIG. 5 is a diagram showing that base control, first control, or second control is executed in accordance with a rated output of a fuel cell stack 12 according to the first embodiment.

FIG. 6 is a diagram showing an example of contents of the base control, the first control, and the second control according to the first embodiment.

FIGS. 8A and 8B are diagrams showing an example of an effect of reducing a temperature increase in the fuel cell stack 12 by the first control and an effect of reducing a temperature increase in the fuel cell stack 12 by the second control.

FIG. 9 is a diagram showing an example of output decrease factor information and an example of deriving an output decrease amount by using the output decrease factor information according to the first embodiment.

FIG. 12 is a flow chart showing an example of factor-specific determination processing executed by the control device 200 according to the first embodiment.

FIG. 13 is a diagram of humidity control in the fuel cell stack 12 according to a second embodiment.

DESCRIPTION OF EMBODIMENTS

Hereinafter, each embodiment of an information processing device and a vehicle including the information processing device according to the present invention will be described. In the following description, the same or similar elements are denoted by the same or similar reference signs, and the description thereof may be omitted or simplified as appropriate.

First Embodiment

First, a first embodiment of the present invention will be described with reference to FIGS. 1 to 9.
<Vehicle>

Figure 1:
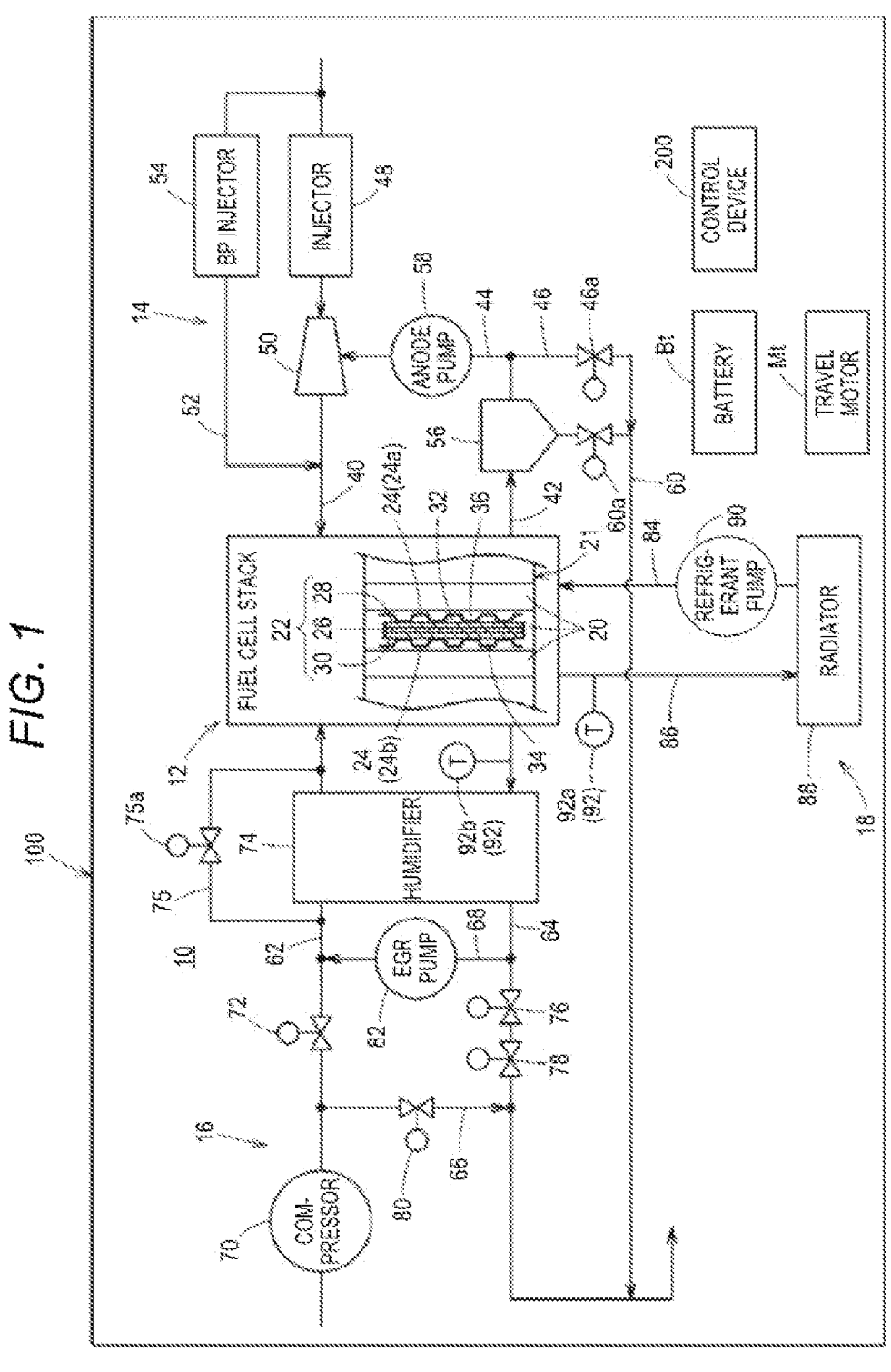
FIG. 1 is a diagram showing an overall configuration of a vehicle 100 according to a first embodiment.

As shown in FIG. 1, a vehicle 100 according to the present embodiment includes a fuel cell system 10. The fuel cell system 10 includes a fuel cell stack 12, an anode system device 14, a cathode system device 16, and a cooling device 18. The fuel cell system 10 is mounted in a motor room, for example, of the fuel cell vehicle 100 (fuel cell electric vehicle, hereinafter simply referred to as "vehicle 100"), and supplies electric power generated by the fuel cell stack 12 to a battery Bt, a travel motor Mt, and the like to drive the vehicle 100.

The fuel cell stack 12 includes a plurality of power generation cells 20 for generating power by an electrochemical reaction between anode gas (fuel gas such as hydrogen) and cathode gas (oxidant gas such as air). The plurality of power generation cells are implemented as a stacked body 21 stacked along a vehicle width direction with electrode surfaces in a standing posture in a state in which the fuel cell stack 12 is mounted on the vehicle 100. The plurality of power generation cells 20 may be stacked in a vehicle length direction (front-rear direction) or in a gravity direction of the vehicle 100.

Each of the power generation cells 20 includes an electrolyte membrane/electrode structure 22 (hereinafter referred to as "MEA 22") and a pair of separators 24 (separator 24a and separator 24b) sandwiching the MEA 22. The MEA 22 includes an electrolyte membrane 26 (for example, a solid polymer electrolyte membrane (cation exchange membrane)), an anode electrode 28 provided at one surface of the electrolyte membrane 26, and a cathode electrode 30 provided at the other surface of the electrolyte membrane 26. Although the detailed description and illustration are omitted, each of the anode electrode 28 and the cathode electrode 30 is implemented by providing a catalyst layer and a gas diffusion layer in this order from an electrolyte membrane 26 side. The catalyst layer (hereinafter, also simply referred to as "catalyst") of each of the anode electrode 28 and the cathode electrode 30 includes, for example, platinum particles for increasing a reaction rate of the electrochemical reaction between the anode gas and the cathode gas, and carbon as a carrier for supporting the platinum particles.

The separator 24*a* forms an anode gas flow path 32 through which anode gas flows at one surface of the MEA 22. The separator 24*b* forms a cathode gas flow path 34 through which cathode gas flows at the other surface of the MEA 22. A refrigerant flow path 36 through which a refrigerant flows is formed at surfaces where the separator 24*a* and the separator 24*b* face each other by stacking the plurality of power generation cells 20.

Further, the fuel cell stack 12 includes a plurality of communication holes (anode gas communication holes, cathode gas communication holes, and refrigerant communication holes) (not shown) through which each of the anode gas, the cathode gas, and the refrigerant flows along a stacking direction of the stacked body 21. The anode gas communication holes communicate with the anode gas flow path 32, the cathode gas communication holes communicate with the cathode gas flow path 34, and the refrigerant communication holes communicate with the refrigerant flow path 36.

The anode gas is supplied to the fuel cell stack 12 by the anode system device 14. In the fuel cell stack 12, the anode gas flows through an anode gas communication hole (anode gas inlet communication hole) to flow into the anode gas flow path 32, and is used for power generation in the anode electrode 28. Anode off-gas (including unreacted hydrogen) used for the power generation flows out from the anode gas flow path 32 to an anode gas communication hole (anode gas outlet communication hole), and is discharged from the fuel cell stack 12 to the anode system device 14.

The cathode gas is supplied to the fuel cell stack 12 by the cathode system device 16. In the fuel cell stack 12, the cathode gas flows through a cathode gas communication hole into the cathode gas flow path 34, and is used for power generation in the cathode electrode 30. Cathode off-gas used for the power generation flows out from the cathode gas flow path 34 to a cathode gas communication hole, and is discharged from the fuel cell stack 12 to the cathode system device 16.

Further, the refrigerant is supplied to the fuel cell stack 12 by the cooling device 18. In the fuel cell stack 12, the refrigerant flows through a refrigerant communication hole into the refrigerant flow path 36, and cools the power generation cell 20. The refrigerant which has cooled the power generation cell 20 flows out from the refrigerant flow path 36 to a refrigerant communication hole, and is discharged from the fuel cell stack 12 to the cooling device 18.

The stacked body 21 of the fuel cell stack 12 is housed in, for example, a stack case (not shown). A terminal plate, an insulating plate, and an end plate (not shown) are arranged in this order outward at both ends of the stacked body 21 in the stacking direction. The end plate applies a tightening load along the stacking direction of the power generation cells 20.

The anode system device 14 of the fuel cell system 10 includes an anode supply path 40 for supplying anode gas to the fuel cell stack 12, and an anode discharge path 42 for discharging anode off-gas from the fuel cell stack 12. An anode circulation path 44 is coupled between the anode supply path 40 and the anode discharge path 42 for returning unreacted hydrogen in the anode off-gas of the anode discharge path 42 to the anode supply path 40. Further, the anode circulation path 44 is coupled to a purge path 46 for discharging the anode off-gas from a circulation circuit of the anode system device 14.

An injector 48 and an ejector 50 are provided in series in the anode supply path 40, and a supply bypass path 52 is coupled across the injector 48 and the ejector 50. A bypass (BP) injector 54 is provided in the supply bypass path 52. The injector 48 is a main injector mainly used during power generation, and the BP injector 54 is a sub injector used to supply a high concentration of hydrogen when the fuel cell stack 12 is started or when high-load power generation is required.

The ejector 50 supplies anode gas to the fuel cell stack 12 downstream while sucking the anode off-gas from the anode circulation path 44 by a negative pressure generated by movement of the anode gas ejected from the injector 48.

The anode discharge path 42 is provided with a gas-liquid separator 56 for separating water (generated water during power generation) in the anode off-gas from the anode off-gas. The anode circulation path 44 is coupled to an upper portion of the gas-liquid separator 56, and anode off-gas (gas) flows to the anode circulation path 44.

The anode circulation path 44 is provided with an anode pump 58 for circulating the anode off-gas to the anode supply path 40. Further, one end of a drain path 60 for discharging the separated water is coupled to a bottom of the gas-liquid separator 56. The drain path 60 is provided with a drain valve 60*a* for opening and closing a flow path. The purge path 46 is coupled to the drain path 60, and a purge valve 46*a* for opening and closing a flow path is provided on the way.

The cathode system device 16 of the fuel cell system 10 includes a cathode supply path 62 for supplying cathode gas to the fuel cell stack 12, and a cathode discharge path 64 for discharging cathode off-gas from the fuel cell stack 12. Between the cathode supply path 62 and the cathode discharge path 64, a cathode bypass path 66 for allowing the cathode gas in the cathode supply path 62 to directly flow to the cathode discharge path 64 and a cathode circulation path 68 for circulating the cathode off-gas in the cathode discharge path 64 to the cathode supply path 62 are coupled.

The cathode supply path 62 is provided with a compressor 70 which compresses air from the atmosphere and supplies the air. The cathode supply path 62 includes a supply-side on-off valve 72 downstream of the compressor 70 and downstream of the cathode bypass path 66, and a humidifier 74 between the compressor 70 (specifically, downstream of the supply-side on-off valve 72) and the fuel cell stack 12. Although not shown, the cathode supply path 62 is provided with an auxiliary device such as an intercooler for cooling the cathode gas. Further, in the vicinity of the humidifier 74 in the cathode supply path 62, a humidifier bypass path 75 for bypassing the humidifier 74 is provided, and a humidifier bypass valve 75*a* for opening and closing the humidifier bypass path 75 is provided.

The humidifier 74 is provided in the cathode discharge path 64. The humidifier 74 humidifies the cathode gas in the cathode supply path 62 with moisture in the cathode off-gas in the cathode discharge path 64. The cathode discharge path 64 includes a discharge-side on-off valve 76 and a back pressure valve 78 downstream of the humidifier 74 and the cathode circulation path 68. Further, the drain path 60 of the anode system device 14 is coupled to the cathode discharge path 64.

The cathode bypass path 66 is provided with a flow rate regulating valve 80 for regulating a flow rate of the cathode gas bypassing the fuel cell stack 12. The cathode circulation path 68 is provided with an EGR pump 82 for circulating the cathode off-gas in the cathode discharge path 64 to the cathode supply path 62.

The cooling device 18 of the fuel cell system 10 has a refrigerant supply path 84 for supplying a refrigerant to the fuel cell stack 12, and a refrigerant discharge path 86 for discharging a refrigerant from the fuel cell stack 12. The refrigerant supply path 84 and the refrigerant discharge path 86 are coupled to a radiator 88 which cools the refrigerant. The refrigerant supply path 84 is provided with a refrigerant pump 90 for circulating a refrigerant in a refrigerant circulation circuit (between the fuel cell stack 12, the refrigerant supply path 84, the refrigerant discharge path 86, and the radiator 88).

The fuel cell system 10 includes a plurality of temperature sensors 92 for detecting a temperature of the fuel cell stack 12. Examples of the temperature sensors 92 include a refrigerant outlet temperature sensor 92*a* provided upstream (fuel cell stack 12 side) of the refrigerant discharge path 86, and a cathode outlet temperature sensor 92*b* provided upstream (fuel cell stack 12 side) of the cathode discharge path 64.

The fuel cell system 10 described above includes a control device (information processing device) 200 which controls an operation of each component in the fuel cell system 10. The control device 200 is implemented by, for example, an electronic control unit (ECU) including a processor which performs various calculations, a storage device having a non-transitory storage medium which stores various types of information, and an input and output device which controls input and output of data between an inside and an outside of the control device 200. The control device 200 may be implemented by one ECU or may be implemented by a plurality of ECUs.

<Control Device>

Figure 2:
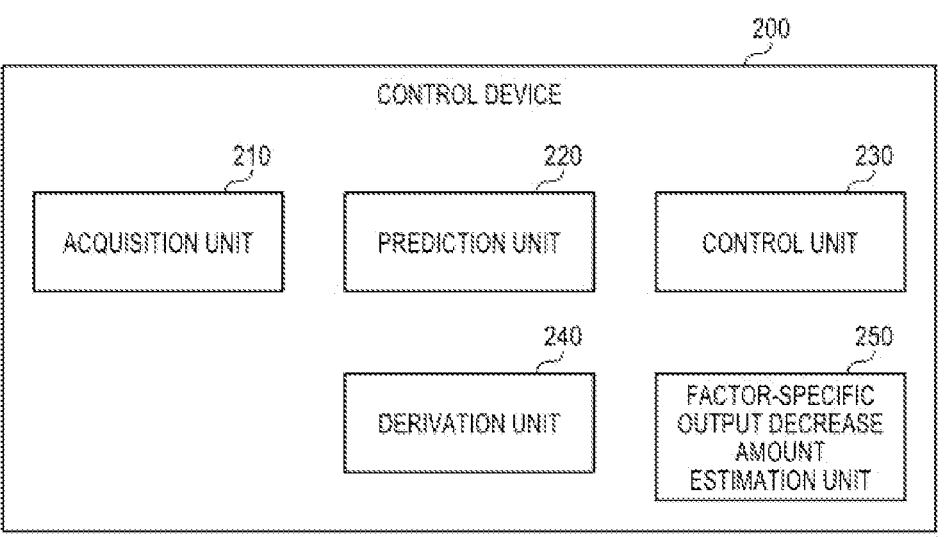
FIG. 2 is a block diagram showing an example of a functional configuration of a control device 200 in the vehicle 100.

As shown in FIG. 2, the control device 200 as the information processing device according to the present embodiment includes, for example, an acquisition unit 210, a prediction unit 220, and a control unit 230 as functional units which are implemented by a processor executing a program stored in the storage device of the control device 200.

The acquisition unit 210 acquires use history information indicating a use history of the vehicle 100. Here, the use history information is information indicating the use history of the vehicle 100 for an item related to deterioration (in other words, output decrease) of the fuel cell stack 12. For example, the use history information includes information indicating the number of times of starts of the vehicle 100 (in other words, the number of times of starts of the fuel cell stack 12), a power generation time of the fuel cell stack 12, and the number of times of fluctuations in an output voltage of the fuel cell stack 12 (hereinafter, also simply referred to as "the number of times of voltage fluctuations") as the item related to the deterioration of the fuel cell stack 12.

The use history information may include information indicating a start time of the vehicle 100 (in other words, a start time of the fuel cell stack 12), instead of or in addition to the information indicating the number of times of starts. The use history information may include information indicating the number of times of power generation of the fuel cell stack 12, instead of or in addition to the information indicating the power generation time. Further, the use history information may include information indicating the number of times of fluctuations in an output current of the fuel cell stack 12 (hereinafter, also simply referred to as "the number of times of current fluctuations"), instead of or in addition to the information indicating the number of times of voltage fluctuations. Generally, counting the number of times of current fluctuations can be implemented more easily in terms of control than counting the number of times of voltage fluctuations.

The use history information may include information indicating the power generation time and/or the number of times of power generation for each output current of the fuel cell stack 12. As a specific example, the use history information may include information in which the power generation time of the fuel cell stack 12 up to now is classified into power generation time for each output current, such as accumulation of the power generation time by an output current of Ia [A] being Na [h], and accumulation of the power generation time by an output current of Ib [A] being Nb [h]. The use history information may include information in which the number of times of power generation of the fuel cell stack 12 up to now is classified into the number of times of power generation for each output current, such as accumulation of the number of times of power generation by the output current of Ia [A] being Nx [times], and accumulation of the number of times of power generation by the output current of Ib [A] being Ny [times]. If the information indicating the power generation time and/or the number of times of power generation for each output current of the fuel cell stack 12 is in the use history information, it is possible to acquire a highly accurate output decrease amount even when an output decrease speed of the fuel cell stack 12 varies depending on a current value of the output current. Instead of or in addition to the information indicating the power generation time and/or the number of times of power generation for each output current, information indicating the power generation time and/or the number of times of power generation for each output voltage of the fuel cell stack 12 may be in the use history information. That is, the use history information may include information in which the power generation time or the number of times of power generation of the fuel cell stack 12 up to now is classified for each output voltage.

Further, the use history information may include information indicating a travel time and/or the number of times of traveling of the vehicle 100, and information indicating a stop time and/or the number of times of stopping of the vehicle 100.

Figure 3:
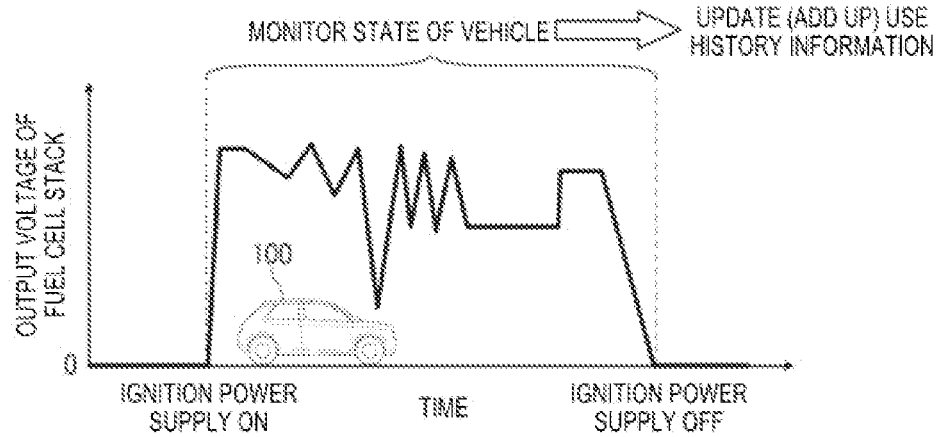
FIG. 3 is a diagram showing an example of update of use history information according to the first embodiment.

For example, as shown in FIG. 3, the control device 200 monitors a state of the vehicle 100 including the output voltage of the fuel cell stack 12 while the vehicle 100 is started (while an ignition power supply is on). By this monitoring, the control device 200 successively adds up, for example, the number of times of starts of the vehicle 100, the power generation time of the fuel cell stack 12, and the number of times of voltage fluctuations in the fuel cell stack 12 from initial start of the vehicle 100, and stores the use history information indicating the number of times of starts of the vehicle 100, the power generation time of the fuel cell stack 12, and the number of times of voltage fluctuations in the fuel cell stack 12 from the initial start of the vehicle 100 up to now in the storage device of the control device 200.

The acquisition unit 210 acquires the use history information stored in the storage device of the control device 200 in this manner at a predetermined timing. A timing at which the acquisition unit 210 acquires the use history information may be, for example, at the time of starting the vehicle 100. In this way, it is possible to predict an output decrease amount of the fuel cell stack 12 each time the vehicle 100 is started. The timing at which the acquisition unit 210 acquires the use history information is not limited to when the vehicle 100 is started, and the acquisition unit 210 may, for example, acquire the use history information when a predetermined operation is received from a user. In this way, the user can predict the output decrease amount of the fuel cell stack 12 at a desired timing.

The prediction unit 220 predicts the output decrease amount of the fuel cell stack 12 based on the use history information acquired by the acquisition unit 210 and output decrease characteristic information indicating an output decrease characteristic of the fuel cell stack 12. Here, the output decrease characteristic information is stored in advance in the storage device of the control device 200, for example. The output decrease characteristic information may be stored in a storage device external to the control device 200 configured for reference by the control device 200.

Figure 4:
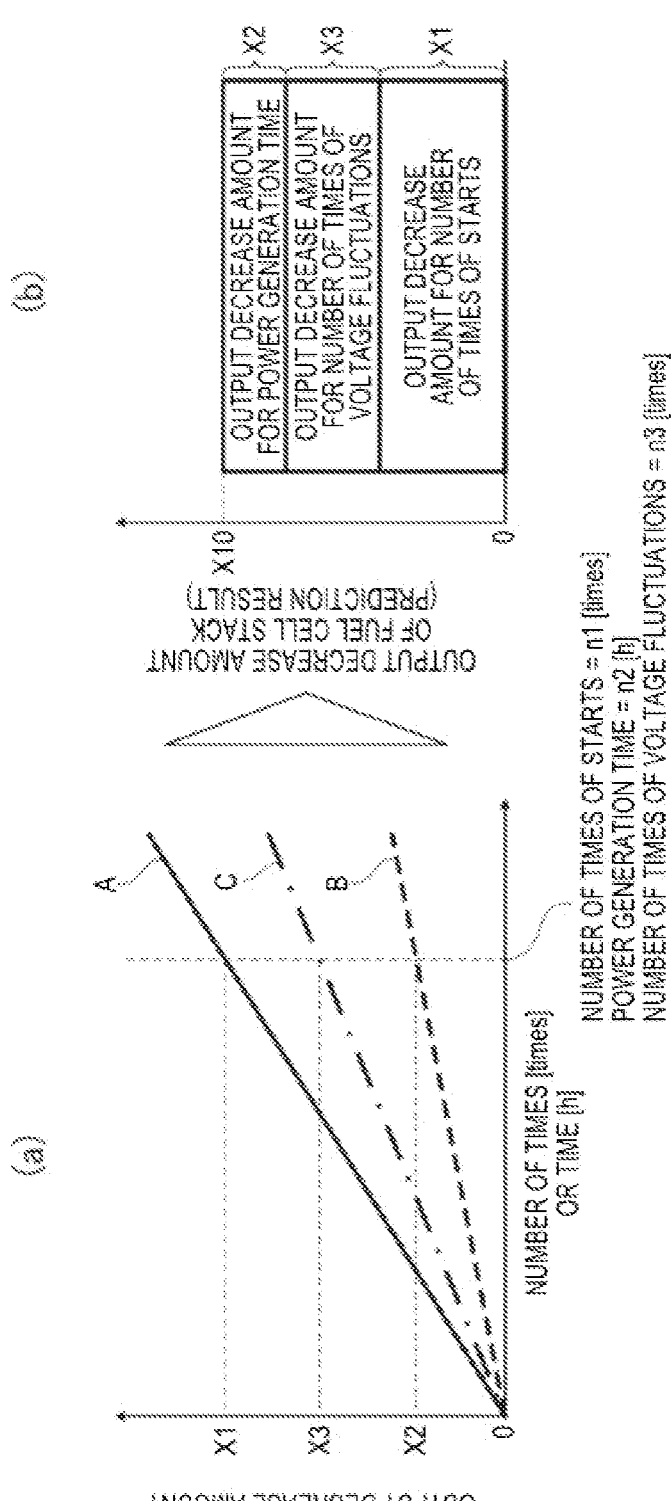
FIG. 4 is a diagram showing an example of output decrease characteristic information and a prediction example of an output decrease amount using the output decrease characteristic information according to the first embodiment.

For example, as shown in (a) of FIG. 4, the output decrease characteristic information may be information indicating each output decrease characteristic, that is, an output decrease characteristic A, an output decrease characteristic B, and an output decrease characteristic C. Here, the output decrease characteristic A is an output decrease characteristic indicating an output decrease amount of the fuel cell stack 12 according to the number of times of starts of the vehicle 100. The output decrease characteristic A indicates that the output decrease amount of the fuel cell stack 12 also increases as the number of times of starts of the vehicle 100 increases, and for example, indicates that the output decrease amount of the fuel cell stack 12 is X1 when the number of times of starts of the vehicle 100 is n1 times (n1>0).

Here, the output decrease characteristic B is an output decrease characteristic indicating an output decrease amount of the fuel cell stack 12 according to the power generation time of the fuel cell stack 12. The output decrease characteristic B indicates that the output decrease amount of the fuel cell stack 12 also increases as the power generation time of the fuel cell stack 12 increases, and for example, indicates that the output decrease amount of the fuel cell stack 12 is X2 when the power generation time of the fuel cell stack 12 is n2 [h] (n2>0).

Here, the output decrease characteristic C is an output decrease characteristic indicating an output decrease amount of the fuel cell stack 12 according to the number of times of voltage fluctuations. The output decrease characteristic C indicates that the output decrease amount of the fuel cell stack 12 also increases as the number of times of voltage fluctuations increases, and for example, indicates that the output decrease amount of the fuel cell stack 12 is X3 when the number of times of voltage fluctuations is n3 (n3>0)).

By referring to such output decrease characteristic information, the prediction unit 220 acquires the output decrease amount of the fuel cell stack 12 for each of the number of times of starts of the vehicle 100, the power generation time of the fuel cell stack 12, and the number of times of voltage fluctuations in the fuel cell stack 12 indicated by the use history information acquired by the acquisition unit 210. The prediction unit 220 derives a value obtained by adding up acquired output decrease amounts as a prediction result.

For example, as shown in (b) of FIG. 4, it is assumed that the output decrease amount for the number of times of starts of the vehicle 100 is X1, the output decrease amount for the power generation time of the fuel cell stack 12 is X2, and the output decrease amount for the number of times of voltage fluctuations is X3. In this case, the prediction unit 220 derives $X10=X1+X2+X3$ as the prediction result of the output decrease amount of the fuel cell stack 12.

For example, when the use history information includes information indicating the start time of the vehicle 100, output decrease characteristic information including information indicating the output decrease amount of the fuel cell stack 12 according to the start time of the vehicle 100 is prepared in advance. Similarly, when the use history information includes information indicating the number of times of power generation of the fuel cell stack 12, the travel time and/or the number of times of traveling of the vehicle 100, or the stop time and/or the number of times of stopping of the vehicle 100, output decrease characteristic information including information indicating the output decrease amount of the fuel cell stack 12 according to the number of times of power generation of the fuel cell stack 12, the travel time and/or the number of times of traveling of the vehicle 100, or the stop time and/or the number of times of stopping of the vehicle 100 is prepared in advance.

The control unit 230 controls the refrigerant pump 90 according to a rated output of the fuel cell stack 12 based on the output decrease amount predicted by the prediction unit 220. Here, as the rated output of the fuel cell stack 12, a value obtained by subtracting the output decrease amount from an initial rated output of the fuel cell stack 12 is calculated.

More specifically, the rated output of the fuel cell stack 12 decreases over time as indicated by a curve D in FIG. 5. When the rated output exceeds a predetermined first threshold value Th1, the control unit 230 controls the refrigerant pump 90 by base control described later. When the rated output is equal to or smaller than the first threshold value Th1 and exceeds a predetermined second threshold value Th2 (where the second threshold value Th2<the first threshold value Th1), the control unit 230 controls the refrigerant pump 90 by first control described later. When the rated output is equal to or smaller than the second threshold value Th2, the control unit 230 controls the refrigerant pump 90 by second control described later.

As shown in FIG. 6, in the case of the base control, the control unit 230 controls a flow rate of the refrigerant pump 90 (hereinafter also referred to as "refrigerant flow rate") for the fuel cell stack 12 by referring to a first flow rate map both during low-load power generation and during high-load power generation Here, the first flow rate map is a map (information) which defines the refrigerant flow rate for each output (that is, load) of the fuel cell stack 12, and is stored in advance in the storage device or the like of the control device 200.

In the case of the first control, the control unit 230 controls the refrigerant flow rate by referring to the first flow rate map during low-load power generation and by referring to a second flow rate map different from the first flow rate map during high-load power generation. Here, the second flow rate map is a map which defines the refrigerant flow rate for each output of the fuel cell stack 12 similarly to the first flow rate map, but is a map in which the refrigerant flow rate associated with each output is more than that in the first flow rate map. That is, the control unit 230 can increase the refrigerant flow rate during high-load power generation when the first control is executed compared with when the base control is executed. The second flow rate map is also stored in advance in the storage device or the like of the control device 200.

In the case of the second control, the control unit 230 controls the refrigerant flow rate by referring to the second flow rate map during both low-load power generation and during high-load power generation. That is, the control unit 230 can increase the refrigerant flow rate during both the low-load power generation and the high-load power generation when the second control is executed compared with when the base control is executed. The control unit 230 can increase the refrigerant flow rate during the low-load power generation when the second control is executed compared with when the first control is executed.

As described above, when the rated output is equal to or smaller than the first threshold value Th1 and exceeds the predetermined second threshold value Th2, the control unit 230 executes the first control to increase the refrigerant flow rate during high-load power generation compared with during the base control. When the rated output is equal to or smaller than the second threshold value Th2, the control unit 230 executes the second control to increase the refrigerant flow rate during the low-load power generation compared with during the first control.

Thus, when the rated output of the fuel cell stack 12 becomes equal to or smaller than the first threshold value Th1, the refrigerant flow rate is increased during high-load power generation compared with before the rated output becomes equal to or smaller than the first threshold value Th1, so that an output of the fuel cell stack 12 can be ensured while reducing a temperature increase in the fuel cell stack 12. Until the rated output of the fuel cell stack 12 becomes equal to or smaller than the first threshold value Th1, energy required for driving the refrigerant pump 90 can be reduced by keeping the refrigerant flow rate as low as possible during high-load power generation.

Since the fuel cell stack 12 tends to reach a high temperature during high-load power generation, when the rated output of the fuel cell stack 12 is equal to or smaller than the first threshold value Th1 and exceeds the second threshold value Th2, the first control is executed to increase the refrigerant flow rate only during high-load power generation of the fuel cell stack 12, so that it is possible to avoid the fuel cell stack 12 from reaching a high temperature while reducing the energy required for driving the refrigerant pump 90.

When the rated output of the fuel cell stack 12 becomes equal to or smaller than the second threshold value Th2, by increasing the refrigerant flow rate during each of the low-load power generation and the high-load power generation of the fuel cell stack 12, a temperature increase during power generation of the fuel cell stack 12 can be reduced, and deterioration of the fuel cell stack 12 can be reduced.

Thus, by controlling the refrigerant flow rate according to the rated output of the fuel cell stack 12, it is possible to execute appropriate control according to a degree of deterioration of the fuel cell stack 12.

Figure 7:
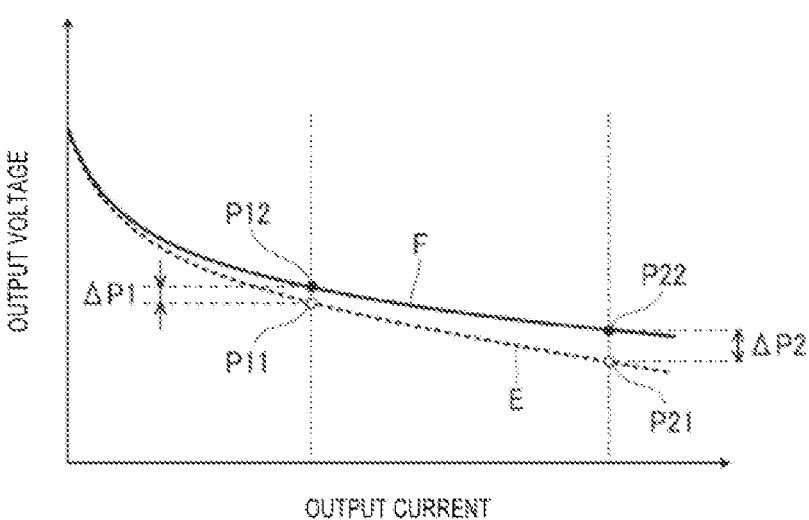
FIG. 7 is a diagram showing an effect of increasing the rated output of the fuel cell stack 12 according to the first control or the second control according to the first embodiment.

FIG. 7 shows an example of the output (specifically, a relationship between an output voltage and an output current) of the fuel cell stack 12 before and after increasing the refrigerant flow rate. Before the refrigerant flow rate is increased, a maximum temperature in each power generation cell 20 is more likely to rise when the output of the fuel cell stack 12 is increased than after the refrigerant flow rate is increased. Therefore, before the refrigerant flow rate is increased, the output of the fuel cell stack 12 is indicated by a broken line E from the viewpoint of protecting the power generation cell 20.

In contrast, by executing the first control or the second control to increase the refrigerant flow rate, a temperature in each of the power generation cells 20 can be made uniform and a maximum temperature in each of the power generation cells 20 can be decreased. Accordingly, after the refrigerant flow rate is increased, the output of the fuel cell stack 12 can be increased to an output indicated by a solid line F. That is, by increasing the refrigerant flow rate, it is possible to increase the output (for example, the rated output) of the fuel cell stack 12 compared with before increasing the refrigerant flow rate.

As shown in FIG. 7, a difference between the rated output of the fuel cell stack 12 after increasing the refrigerant flow rate (solid line F) and the rated output of the fuel cell stack 12 before increasing the refrigerant flow rate (broken line E) is, for example, P12-P11=ΔP1 during low-load power generation, and is, for example, P22-P21=ΔP2 (ΔP2>ΔP1) during high-load power generation. That is, an effect of increasing the rated output by increasing the refrigerant flow rate is greater during high-load power generation than during low-load power generation.

FIGS. 8A and 8B show a characteristic curve G representing a catalyst deterioration characteristic, that is, a relationship between an increase in a refrigerant temperature and deterioration of a catalyst, and frequency curves H, I, and J representing frequencies of the refrigerant temperature during execution of the base control, the first control, and the second control, respectively. The catalyst deterioration characteristic represents a relationship between an increase in the refrigerant temperature, that is, a temperature of the fuel cell stack 12 and the deterioration of the catalyst. The catalyst is more likely to deteriorate as the refrigerant temperature increases. A frequency of the refrigerant temperature is a frequency at which the refrigerant temperature becomes each temperature.

As shown in FIG. 8A, in the frequency curve I during execution of the first control, a portion (range from T1 to T2) on a high temperature side mainly shifts to a low temperature side as compared with the frequency curve H during execution of the base control. Accordingly, a frequency of the refrigerant temperature becoming high decreases.

As shown in FIG. 8B, the frequency curve J during execution of the second control is shifted overall to a low temperature side as compared with the frequency curve H during execution of the base control. Accordingly, a frequency of a refrigerant temperature becoming high (temperature in a range from T4 to T5) decreases, and a frequency of a refrigerant temperature becoming low (temperature in a range from T3 to T4) increases.

Thus, by executing the first control and the second control, the frequency of the refrigerant temperature becoming high is reduced compared with when the base control is executed, so that it is possible to reduce deterioration of the catalyst, that is, deterioration of the fuel cell stack 12.

For example, even when the rated output of the fuel cell stack 12 is larger than the first threshold value Th1, deterioration may progress in some of constituent elements (for example, catalyst) of the fuel cell stack 12. In such a case, it is desirable to execute control in consideration of a degree of deterioration of a constituent element, which is a main output decrease factor of the fuel cell stack 12.

Therefore, as shown in FIG. 2, the control device 200 further includes a derivation unit 240 and a factor-specific output decrease amount estimation unit 250, for example, as functional units implemented by a processor executing a program stored in the storage device of the control device 200.

The derivation unit 240 derives the output decrease amount for each item based on the use history information acquired by the acquisition unit 210 and the output decrease characteristic information (described above) indicating the output decrease characteristic of the fuel cell stack 12 for each item. For example, similarly to the prediction unit 220 described above, the derivation unit 240 derives, as the output decrease amount for each item, an output decrease amount for the number of times of starts of the vehicle 100, an output decrease amount for the power generation time of the fuel cell stack 12, and an output decrease amount for the number of times of voltage fluctuations. The derivation unit 240 may be implemented by the prediction unit 220.

The factor-specific output decrease amount estimation unit 250 estimates an output decrease amount for each of output decrease factors based on the output decrease amount for each item derived by the derivation unit 240 and the output decrease factor information indicating the output decrease factor of the fuel cell stack 12 for each item. Here, the output decrease factor information is stored in advance in the storage device of the control device 200, for example. The output decrease factor information may be stored in a storage device external to the control device 200 configured for reference by the control device 200.

An item in the output decrease factor information corresponds to an item in the use history information acquired by the acquisition unit 210. For example, when the use history information acquired by the acquisition unit 210 is the number of times of starts of the vehicle 100, the power generation time of the fuel cell stack 12, the number of times of voltage fluctuations in the fuel cell stack 12, the travel time of the vehicle 100, and the stop time of the vehicle 100, as shown in (a) and (b) of FIG. 9, items in output decrease factor information T are also the number of times of starts, the power generation time, the number of times of voltage fluctuations, the travel time, and the stop time. The output decrease factor information T shown in (a) and (b) of FIG. 9 indicates that an output decrease factor for the number of times of starts and the travel time is a factor α, an output decrease factor for the power generation time and the stop time is a factor, and an output decrease factor for the number of times of voltage fluctuations is a factor γ. For example, the factor α can include, but is not limited to, deterioration of a platinum component in the catalyst, the factor β can include, but is not limited to, deterioration of a carbon component in the catalyst, and the factor γ can include, but is not limited to, an increase in an internal resistance of the fuel cell stack 12.

Based on the use history information acquired by the acquisition unit 210 and the output decrease characteristic information for each item (see (a) of FIG. 4), the derivation unit 240 derives the output decrease amount of the fuel cell stack 12 for each item, that is, an output decrease amount X11 for the number of times of starts, an output decrease amount X12 for the power generation time, an output decrease amount X13 for the number of times of voltage fluctuations, an output decrease amount X14 for the travel time, and an output decrease amount X15 for the stop time, for example, as shown in (a) of FIG. 9.

In this case, the factor-specific output decrease amount estimation unit 250 estimates the output decrease amount for each of the output decrease factors based on the output decrease amounts X11. X12, X13, X14, and X15 for each item derived by the derivation unit 240 and the output decrease factor information T, for example, as shown in (b) of FIG. 9.

That is, the factor-specific output decrease amount estimation unit 250 derives a total value X11+X14 of the output decrease amount X11 for the number of times of starts and the output decrease amount X14 for the travel time as an output decrease amount due to the factor α. The factor-specific output decrease amount estimation unit 250 derives a total value X12+X15 of the output decrease amount X12 for the power generation time and the output decrease amount X15 for the stop time as an output decrease amount due to the factor β. The factor-specific output decrease amount estimation unit 250 derives the output decrease amount X13 for the number of times of voltage fluctuations as an output decrease amount due to the factor γ.

The control unit 230 is configured to execute predetermined control based on the output decrease amount for each of the output decrease factors estimated by the factor-specific output decrease amount estimation unit 250. More specifically, the control unit 230 executes control to increase the refrigerant flow rate when any one of the output decrease amounts for each of the output decrease factors is equal to or larger than a fourth threshold value, compared with when all of the output decrease amounts for each of the output decrease factors are less than the fourth threshold value.

Figure 10:
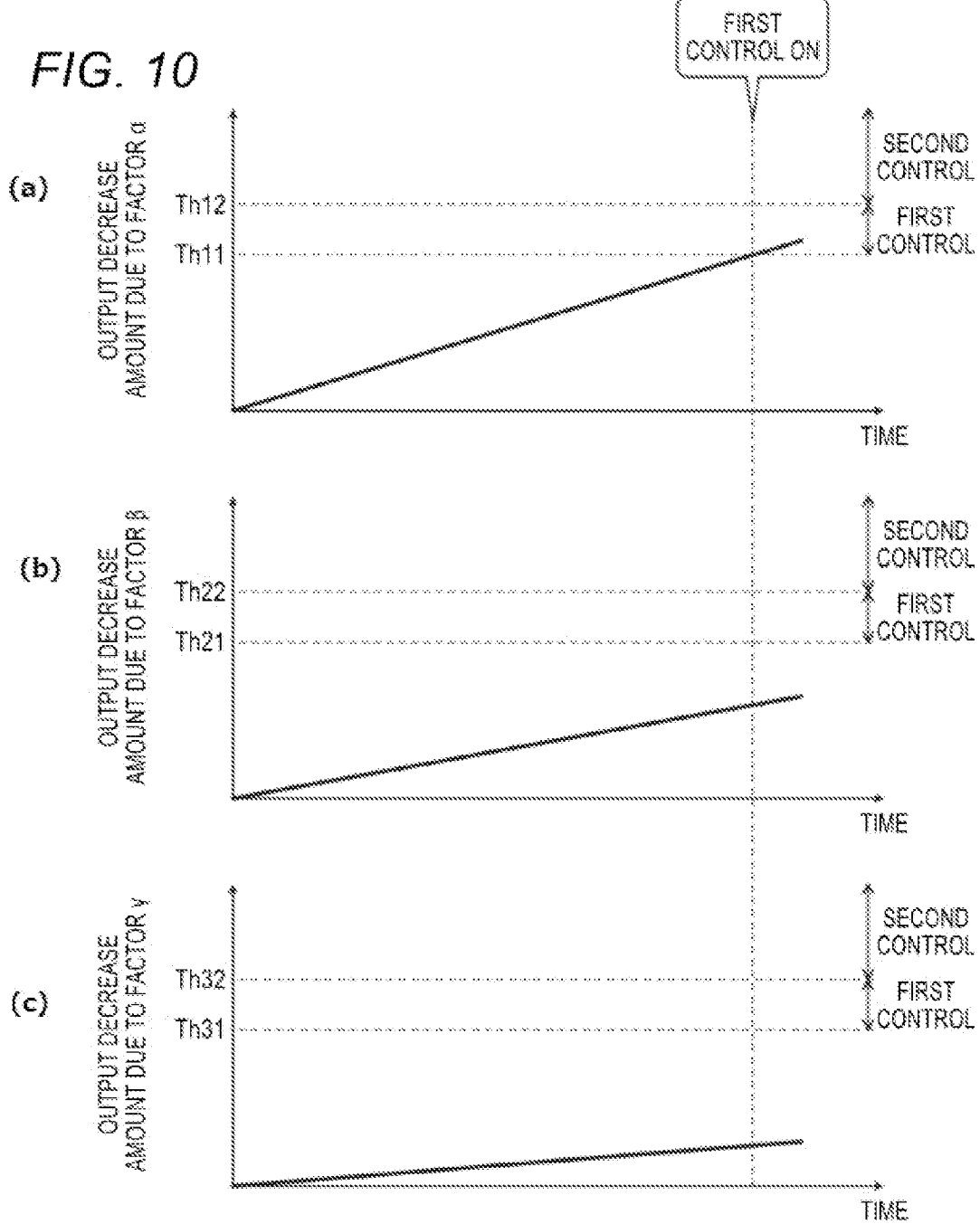
FIG. 10 is a diagram of execution conditions for the first control and the second control for each of output decrease factors according to the first embodiment.

For example, as shown in (a) to (c) of FIG. 10, when the output decrease amount due to the factor α reaches a fourth threshold value Th11 which is a fourth threshold value corresponding to the output decrease amount (see (a) of FIG. 10), when the output decrease amount due to the factor β reaches a fourth threshold value Th21 which is a fourth threshold value corresponding to the output decrease amount (see (b) of FIG. 10), or when the output decrease amount due to the factor γ reaches a fourth threshold value Th31 which is a fourth threshold value corresponding to the output decrease amount (see (c) of FIG. 10), the control unit 230 executes the above first control.

In the example shown in (a) to (c) of FIG. 10, although the output decrease amount due to the factor β and the factor γ does not reach the fourth threshold values Th21 and Th31, the output decrease amount due to the factor α reaches the fourth threshold value Th1*l*, so the first control is executed. The fourth threshold values Th11, Th21, and Th31 are set in advance for the control device 200 by, for example, a manufacturer of the fuel cell system 10 or the control device 200.

Further, the control unit 230 may execute the above second control when the output decrease amount due to the factor α reaches a fifth threshold value Th12 which is a fifth threshold value corresponding to the output decrease amount (the fifth threshold value Th12>the fourth threshold value Th1*l*, see (a) of FIG. 10), when the output decrease amount due to the factor β reaches a fifth threshold value Th22 which is a fifth threshold value corresponding to the output decrease amount (the fifth threshold value Th22>the fourth threshold value Th21, see (b) of FIG. 10), or when the output decrease amount due to the factor γ reaches a fifth threshold value Th32 which is a fifth threshold value corresponding to the output decrease amount (the fifth threshold value Th32>the fourth threshold value Th31, see (c) of FIG. 10). In this case, the fifth threshold values Th12, Th22, and Th32 are set in advance for the control device 200 by, for example, a manufacturer of the fuel cell system 10 or the control device 200.

Thus, by executing control to increase the refrigerant flow rate when any one of the output decrease amounts for each of the output decrease factors is equal to or larger than the threshold value (the fourth threshold value or the fifth threshold value), it is possible to increase the refrigerant flow rate when deterioration of some constituent elements (for example, catalyst) of the fuel cell stack 12 may progress, even when the rated output of the fuel cell stack 12 is larger than the first threshold value Th1.

<Processing Executed by Control Device According to First Embodiment>

Next, an example of processing executed by the control device 200 according to the first embodiment will be described with reference to FIG. 11. For example, when the vehicle 100 is in a travelable state, the control device 200 repeats the execution of the processing shown in FIG. 11 at a predetermined cycle.

Figure 11:
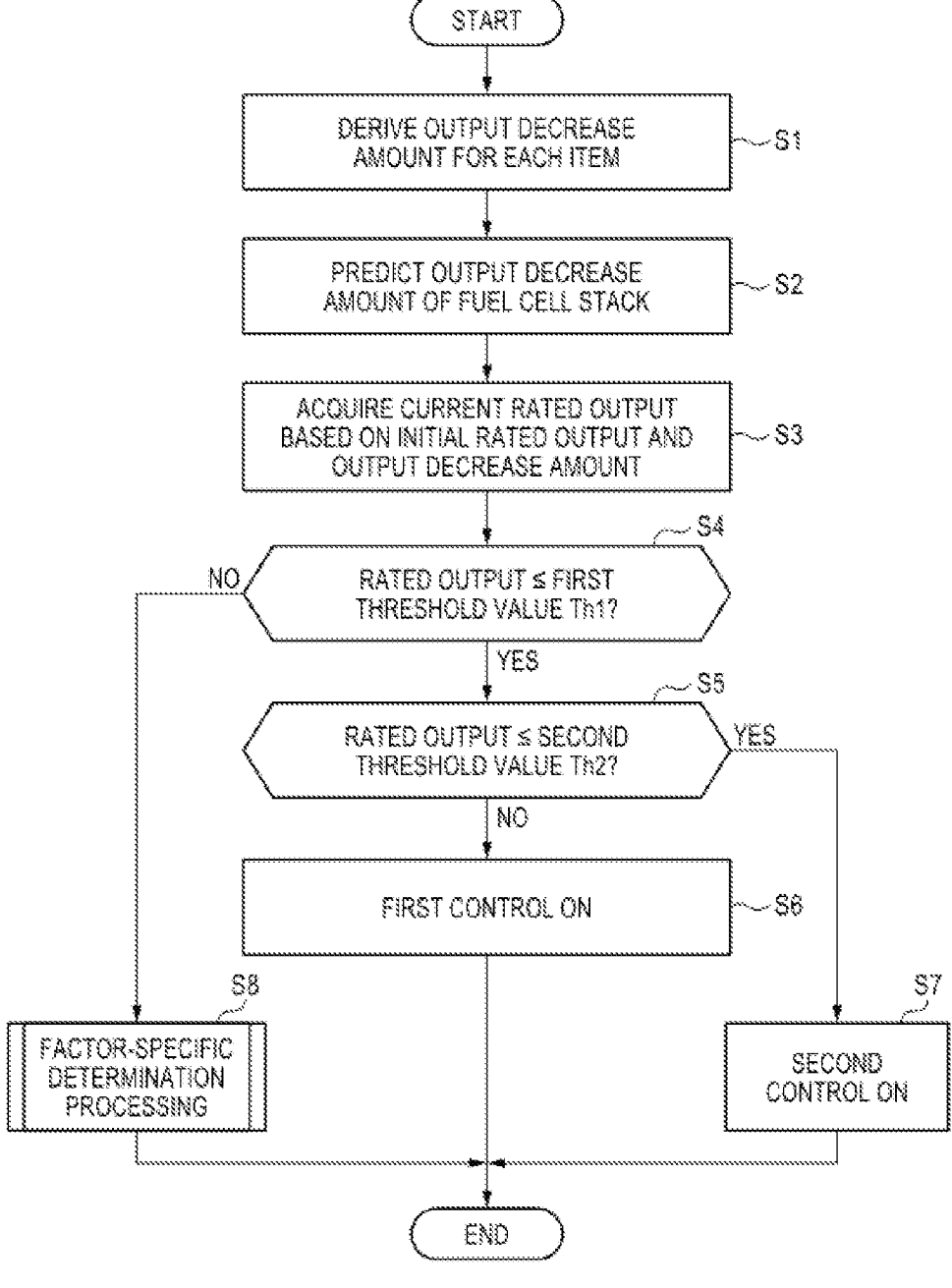
FIG. 11 is a flow chart showing an example of processing executed by the control device 200 according to the first embodiment.

As shown in FIG. 11, the control device 200 derives an output decrease amount for each item in the fuel cell stack 12 (step S1). Next, the control device 200 predicts an output decrease amount of the fuel cell stack 12 based on the derived output decrease amount for each item (step S2), and acquires a current rated output based on an initial rated output and the predicted output decrease amount of the fuel cell stack 12 (step S3).

Next, the control device 200 determines whether the rated output is equal to or smaller than the first threshold value Th1 (step S4). If it is determined that the rated output is equal to or smaller than the first threshold value Th1) (step S4: Yes), the control device 200 determines whether the rated output is equal to or smaller than the second threshold value Th2 (step S5). If it is determined that the rated output is larger than the second threshold value Th2 (step S5: No), the control device 200 executes the first control (step S6), and if it is determined that the rated output is equal to or smaller than the second threshold value Th2 (step S5: Yes), the control device 200 executes the second control (step S7).

On the other hand, if it is determined that the rated output is larger than the first threshold value Th1 (step S4: No), the control device 200 proceeds to factor-specific determination processing (step S8).

As shown in FIG. 12, in the factor-specific determination processing (step S8), the control device 200 derives an output decrease amount for each of output decrease factors (step S11), and determines whether the output decrease amount for any one of the output decrease factors is equal to or larger than the fourth threshold value corresponding to the output decrease amount, that is, whether the output decrease amount due to the factor α is equal to or larger than the fourth threshold value Th11, whether the output decrease amount due to the factor β is equal to or larger than the fourth threshold value Th21, and whether the output decrease amount due to the factor γ is equal to or larger than the fourth threshold value Th31 (step S12).

As a result, if it is determined that all of the output decrease amounts for each of the output decrease factors are less than the fourth threshold value (step S12: No), the control device 200 executes the base control (step S13).

On the other hand, if it is determined that the output decrease amount for any one of the output decrease factors is equal to or larger than the fourth threshold value (step S12: Yes), the control device 200 determines whether the output decrease amount for any one of the output decrease factors is equal to or larger than the fifth threshold value corresponding to the output decrease amount, that is, whether the output decrease amount due to the factor α is equal to or larger than the fifth threshold value Th12, whether the output decrease amount due to the factor β is equal to or larger than the fifth threshold value Th22, and whether the output decrease amount due to the factory is equal to or larger than the fifth threshold value Th32 (step S14).

As a result, if it is determined that all of the output decrease amounts for each of the output decrease factors are less than the fifth threshold value (step S14: No), the control device 200 executes the first control (step S15).

On the other hand, if it is determined that the output decrease amount for any one of the output decrease factors is equal to or larger than the fifth threshold value (step S14. Yes), the control device 200 executes the second control (step S16).

Thus, according to the first embodiment, even when the rated output of the fuel cell stack 12 is not equal to or smaller than the first threshold value Th1, when the output decrease amount due to any one of the output decrease factors is equal to or larger than the fourth threshold value, the first control can be executed to increase the refrigerant flow rate. This makes it possible to increase the refrigerant flow rate in response to an increase in the output decrease amount due to any one of the output decrease factors, and to ensure the output of the fuel cell stack 12 while reducing the temperature increase in the fuel cell stack 12 which leads to deterioration. Until the output decrease amount due to any one of the output decrease factors becomes equal to or larger than the fourth threshold value, the base control is executed to reduce the refrigerant flow rate, thereby making it possible to reduce the energy required for driving the refrigerant pump 90.

When the output decrease amount due to any one of the output decrease factors becomes equal to or larger than the fourth threshold value, the first control is executed to increase the refrigerant flow rate only during the high-load power generation of the fuel cell stack 12, so that it is possible to avoid the fuel cell stack 12 from reaching a high temperature while reducing the energy required for driving the refrigerant pump 90.

When the output decrease amount due to any one of the output decrease factors is equal to or larger than the fifth threshold value, the second control is executed to increase the refrigerant flow rate during each of the low-load power generation and the high-load power generation of the fuel cell stack 12, so that a temperature increase during power generation of the fuel cell stack 12 can be reduced, and deterioration of the fuel cell stack 12 can be reduced.

Thus, the control device 200 can execute appropriate control according to the degree of deterioration of the fuel cell stack 12 by controlling the refrigerant flow rate according to the output decrease amount of the fuel cell stack 12 and the output decrease amount for each output decrease factor.

Second Embodiment

Next, a second embodiment of the present invention will be described with reference to FIGS. 13 to 15. In the following description, the same constituent elements as those in the first embodiment are denoted by the same reference signs, and the description thereof will be omitted or simplified.

<Control Device>

The control device 200 (the control unit 230) according to the second embodiment executes third control to decrease a target temperature of the refrigerant for cooling the fuel cell stack 12 used for control of the cooling device 18 in which the refrigerant circulates when it is determined that the rated output of the fuel cell stack 12 is equal to or smaller than a third threshold value Th3, compared with before the rated output becomes equal to or smaller than the third threshold value Th3. The third control includes control to decrease the target temperature of the refrigerant by increasing the refrigerant flow rate. For example, the control device 200 controls the cooling device 18 such that a detection value of the refrigerant outlet temperature sensor 92a becomes the target temperature. The third threshold value Th3 may be the same value as the first threshold value Th1 or the second threshold value Th2 in the first embodiment, or may be a value different from the first threshold value Th1 or the second threshold value Th2 (for example, a value smaller than the second threshold value Th2).

Thus, the third control to decrease the target temperature of the refrigerant is executed when the rated output of the fuel cell stack 12 becomes equal to or smaller than the third threshold value Th3, compared with before the rated output becomes equal to or smaller than the third threshold value Th3, so that the temperature of the fuel cell stack 12 is decreased and deterioration of the fuel cell stack 12 can be further reduced.

Even when the rated output of the fuel cell stack 12 is larger than the third threshold value Th3, deterioration may progress in some of the constituent elements (for example, catalyst) of the fuel cell stack 12. Therefore, the control device 200 (the control unit 230) according to the second embodiment may execute control to decrease the target temperature of the refrigerant when any one of the output decrease amounts for each of the output decrease factors is equal to or larger than a sixth threshold value, compared with when all of the output decrease amounts for each of the output decrease factors are less than the sixth threshold value.

For example, similarly to the fourth threshold values Th1/, Th21, and Th31 or the fifth threshold values Th12, Th22, and Th32, the sixth threshold value is provided corresponding to the output decrease amount for each of the output decrease factors. The sixth threshold value corresponding to the output decrease amount due to the factor α may be the same value as the fourth threshold value Th11 or the fifth threshold value Th12, or may be a value different from the fourth threshold value Th11 or the fifth threshold value Th12 (for example, a value larger than the fifth threshold value Th12). The sixth threshold value corresponding to the output decrease amount due to the factor β may be the same value as the fourth threshold value Th21 or the fifth threshold value Th22, or may be a value different from the fourth threshold value Th21 or the fifth threshold value Th22 (for example, a value larger than the fifth threshold value Th22). The sixth threshold value corresponding to the output decrease amount due to the factor γ may be the same value as the fourth threshold value Th31 or the fifth threshold value Th32, or may be a value different from the fourth threshold value Th31 or the fifth threshold value Th32 (for example, a value larger than the fifth threshold value Th32).

At this point, when a temperature of the fuel cell stack 12 decreases, as shown in FIG. 13, a dew condensation region (region where humidity is 100% or more) in the fuel cell stack 12 expands. Since power generation efficiency of the fuel cell stack 12 decreases in the dew condensation region, it is necessary to reduce expansion of the dew condensation region.

Therefore, the control device 200 according to the second embodiment further executes control to decrease the humidity in the fuel cell stack 12 when the target temperature of the refrigerant is decreased, compared with before the target temperature is decreased. That is, as shown in FIG. 13, the control device 200 controls the humidity in the fuel cell stack 12 so that a humidity range (a humidity range indicated by solid lines) in which no dew condensation occurs after the target temperature of the refrigerant is decreased is shifted to a low temperature side with respect to a humidity range (a humidity range indicated by broken lines) in which no dew condensation occurs before the target temperature of the refrigerant is decreased. Humidity control in the fuel cell stack 12 is achieved, for example, by controlling a humidification amount and a drainage amount in the fuel cell stack 12. Accordingly, even after the temperature of the refrigerant is decreased, power generation by the fuel cell stack 12 can be efficiently performed.

<Processing Executed by Control Device According to Second Embodiment>

Next, an example of processing executed by the control device 200 according to the second embodiment will be described. For example, when the vehicle 100 is in a travelable state, the control device 200 repeats execution of processing shown in FIG. 14 at a predetermined cycle.

Figure 14:
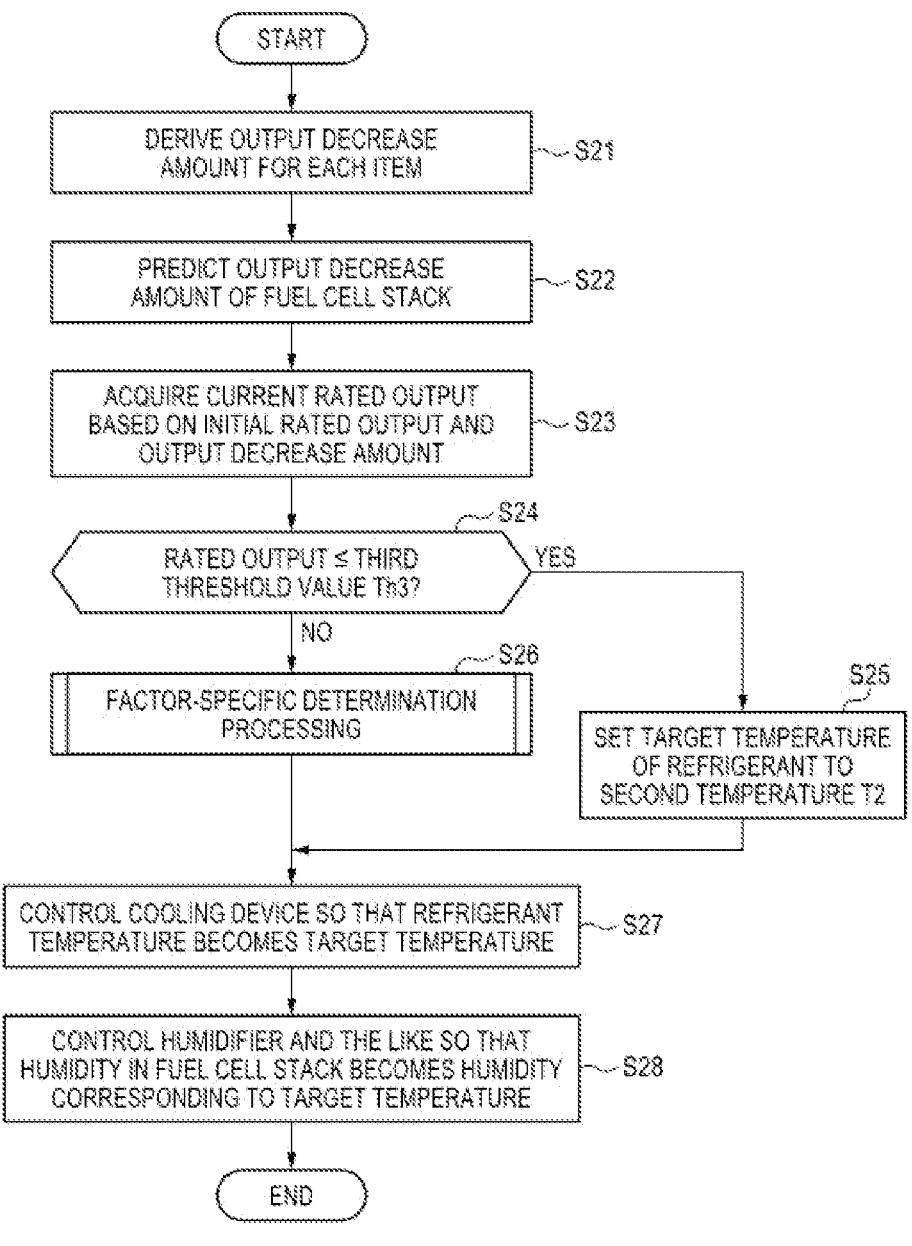
FIG. 14 is a flow chart showing an example of processing executed by the control device 200 according to the second embodiment.

As shown in FIG. 14, the control device 200 derives an output decrease amount for each item in the fuel cell stack 12 (step S21). The control device 200 predicts an output decrease amount of the fuel cell stack 12 based on the derived output decrease amount for each item (step S22), and acquires a current rated output based on an initial rated output and the predicted output decrease amount of the fuel cell stack 12 (step S23).

Next, the control device 200 determines whether the rated output is equal to or smaller than the third threshold value Th3 (step S24). If the control device 200 determines that the rated output is equal to or smaller than the third threshold value Th3 (step S24: Yes), the control device 200 sets the target temperature of the refrigerant to a second temperature T2 (step S25).

On the other hand, if it is determined that the rated output is larger than the third threshold value Th3 (step S24: Yes), the control device 200 executes factor-specific determination processing (step S26).

Figure 15:
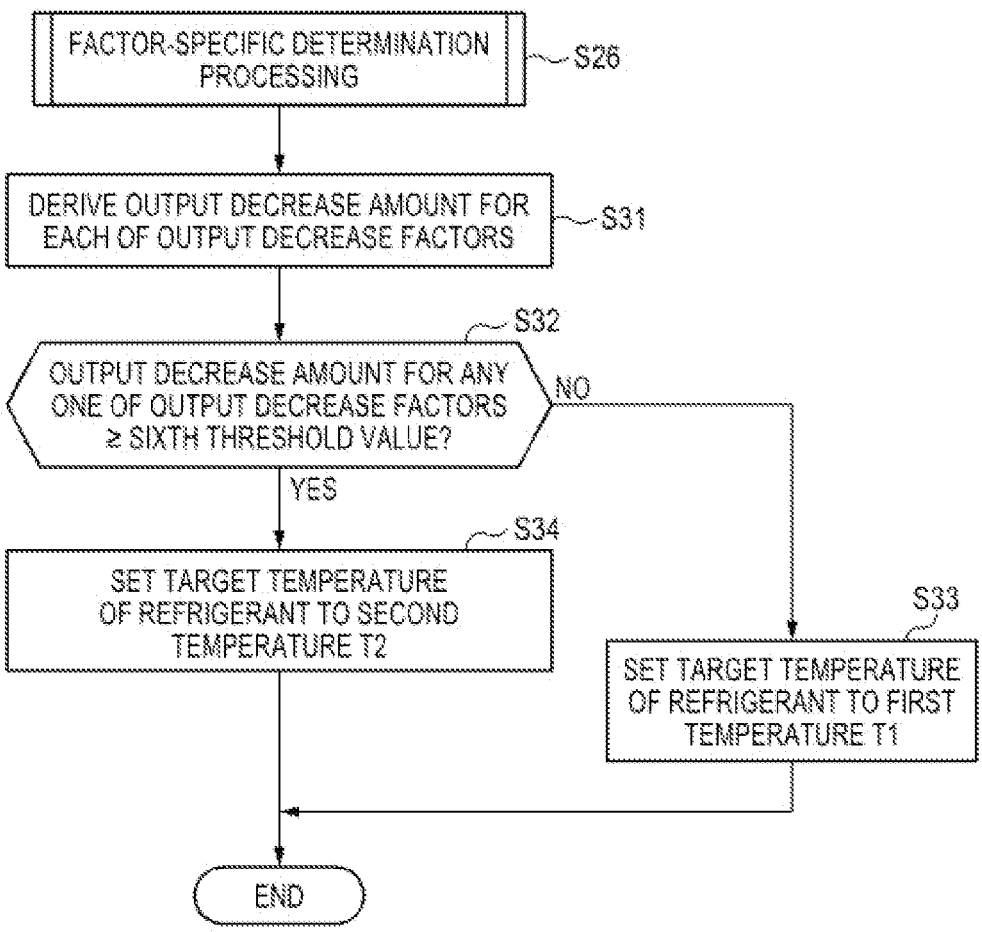
FIG. 15 is a flow chart showing an example of factor-specific determination processing executed by the control device 200 according to the second embodiment.

As shown in FIG. 15, in the factor-specific determination processing (step S26), the control device 200 derives an output decrease amount for each of output decrease factors (step S31), and determines whether the output decrease amount for any one of the output decrease factors is equal to or larger than the sixth threshold value corresponding to the output decrease amount (step S32).

As a result, if it is determined that all of the output decrease amounts for each of the output decrease factors are less than the sixth threshold value (step S32: No), the control device 200 sets the target temperature of the refrigerant to a first temperature T1 which is higher than the second temperature T2 (step S33).

On the other hand, if it is determined that the output decrease amount for any one of the output decrease factors is equal to or larger than the sixth threshold value (step S32: Yes), the control device 200 sets the target temperature of the refrigerant to the second temperature T2 (step S34).

As shown in FIG. 14, the control device 200 controls the cooling device 18 so that the refrigerant temperature, that is, the temperature of the fuel cell stack 12 becomes the target temperature (step S27), and controls the humidifier 74 and the like so that the humidity in the fuel cell stack 12 becomes humidity corresponding to the target temperature (step S28).

Thus, according to the second embodiment, when the rated output of the fuel cell stack 12 becomes equal to or smaller than the third threshold value Th3 (step S24: Yes), the temperature of the refrigerant supplied to the fuel cell stack 12 is set to the second temperature T2 (step S25), so that the temperature of the fuel cell stack 12 can be decreased, and deterioration of the fuel cell stack 12 can be further reduced.

According to the second embodiment, when the rated output of the fuel cell stack 12 is larger than the third threshold value Th3 (step S24: No) and when the output decrease amount due to any one of the output decrease factors is equal to or larger than the sixth threshold value (step S32: Yes), the temperature of the refrigerant supplied to the fuel cell stack 12 is set to the second temperature T2 (step S34), so that the temperature of the fuel cell stack 12 can be decreased, and deterioration of the fuel cell stack 12 can be reduced.

According to the second embodiment, when the rated output of the fuel cell stack 12 is larger than the third threshold value Th3 (step S24: No) and when all of the output decrease amounts for each of output decrease factors are less than the sixth threshold value (step S32: No), the temperature of the refrigerant supplied to the fuel cell stack 12 is set to the first temperature T1 which is higher than the second temperature T2 (step S33), so that a load on the cooling device 18 can be reduced and energy required for driving the cooling device 18 can be reduced.

Thus, according to the second embodiment, it is possible to ensure the output of the fuel cell stack 12 while reducing the temperature increase in the fuel cell stack 12 which leads to deterioration. When the target temperature of the refrigerant that cools the fuel cell stack 12 is decreased, by decreasing the humidity in the fuel cell stack 12, deterioration of the fuel cell stack 12 and decreasing of the power generation efficiency can be reduced.

Third Embodiment

Next, a third embodiment of the present invention will be described with reference to FIG. 16. In the following description, the same constituent elements as those in the first embodiment are denoted by the same reference signs, and the description thereof will be omitted or simplified. <Processing Executed by Control Device According to Third Embodiment>

Figure 16:
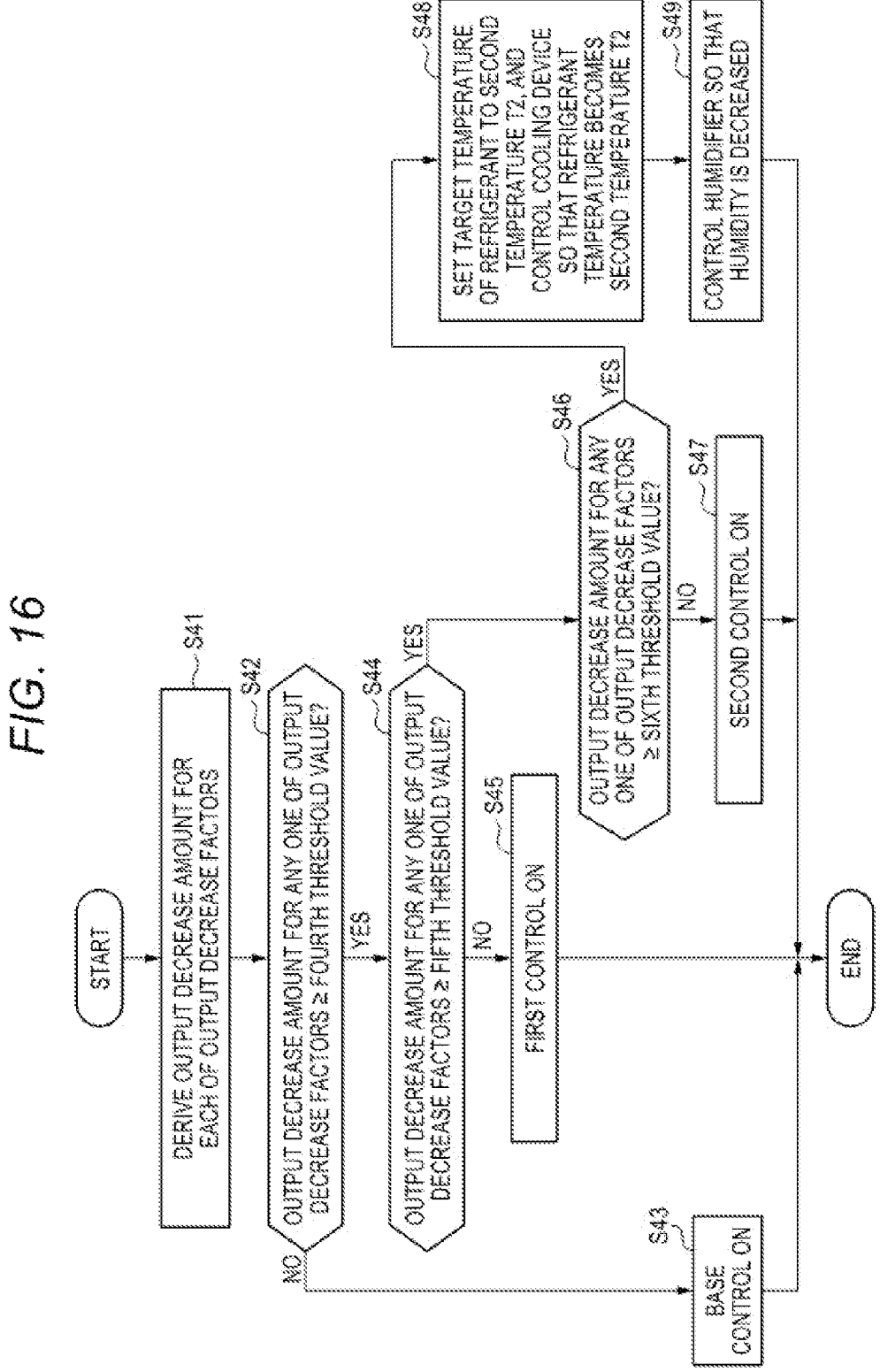
FIG. 16 is a flow chart showing an example of processing executed by the control device 200 according to a third embodiment.

For example, when the rated output of the fuel cell stack 12 is larger than a predetermined value (for example, the third threshold value Th3), the control device 200 according to the third embodiment executes processing shown in FIG. 16.

As shown in FIG. 16, the control device 200 derives an output decrease amount for each of output decrease factors of the fuel cell stack 12 (step S41), and determines whether the output decrease amount for any one of the output decrease factors is equal to or larger than the fourth threshold value (step S42).

As a result, if it is determined that all of the output decrease amounts for each of the output decrease factors are less than the fourth threshold value (step S42: No), the control device 200 executes the base control (step S43). In the base control, the target temperature of the refrigerant is, for example, the first temperature T1.

On the other hand, if it is determined that the output decrease amount for any one of the output decrease factors is equal to or larger than the fourth threshold value (step S42: Yes), the control device 200 determines whether the output decrease amount for any one of the output decrease factors is equal to or larger than the fifth threshold value (step S44).

As a result, if it is determined that all of the output decrease amounts for each of the output decrease factors are less than the fifth threshold value (step S44: No), the control device 200 executes the first control (step S45).

On the other hand, if it is determined that the output decrease amount for any one of the output decrease factors is equal to or larger than the fifth threshold value (step S44: Yes), the control device 200 determines whether the output decrease amount for any one of the output decrease factors is equal to or larger than the sixth threshold value which is larger than the fifth threshold value (step S46).

As a result, if it is determined that all of the output decrease amounts for each of the output decrease factors are less than the sixth threshold value (step S46: No), the control device 200 executes the second control (step S47).

On the other hand, if it is determined that the output decrease amount for any one of the output decrease factors is equal to or larger than the sixth threshold value (step S46: Yes), the control device 200 sets the target temperature of the refrigerant to the second temperature T2 which is lower than the first temperature T1, and controls the cooling device 18 so that the refrigerant temperature, that is, the temperature of the fuel cell stack 12 becomes the target temperature (step S48), and controls the humidifier 74 and the like so that the humidity in the fuel cell stack 12 is decreased compared with before decreasing the target temperature (step S49).

As described above, according to the third embodiment, the base control is executed until the output decrease amount for any one of the output decrease factors becomes equal to or larger than the fourth threshold value, the first control is executed when the output decrease amount for any one of the output decrease factors is equal to or larger than the fourth threshold value, and the second control is executed when the output decrease amount for any one of the output decrease factors is equal to or larger than the fifth threshold value. Therefore, a temperature increase during power generation of the fuel cell stack 12 can be reduced and the deterioration of the fuel cell stack 12 can be reduced, and further, when the output decrease amount for any one of the output decrease factors is equal to or larger than the sixth threshold value, by decreasing the temperature of the fuel cell stack 12 and decreasing the humidity in the fuel cell stack 12, deterioration of the fuel cell stack 12 can be further reduced while reducing a decrease in the power generation efficiency.

As described above, according to each embodiment of the present invention, by executing control in consideration of the degree of deterioration of the fuel cell stack 12, it is possible to ensure the output of the fuel cell stack 12 while reducing deterioration of the fuel cell stack 12. In addition, it is possible to contribute to efficiency of energy.

Although the embodiments of the present invention are described above with reference to the accompanying drawings, it goes without saying that the present invention is not limited to such embodiments. It will be apparent to those skilled in the art that various changes and modifications may be conceived within the scope of the claims, and it is also understood that the various changes and modifications belong to the technical scope of the present invention. The respective constituent elements in the above embodiments may be combined as desired without departing from the gist of the invention.

For example, in the above embodiment, when any one of the output decrease amounts for each of the output decrease factors is equal to or larger than the threshold value, the control to increase the refrigerant flow rate or the control to decrease the target temperature of the refrigerant is executed, but the present invention is not limited thereto. For example, when it is assumed that an effect of the control to increase the refrigerant flow rate or the control to decrease the target temperature of the refrigerant is small with respect to an output decrease due to a specific output decrease factor (for example, the factor $\gamma$), the control to increase the refrigerant flow rate or the control to decrease the target temperature of the refrigerant may not be executed even if the output decrease amount due to the output decrease factor is large. That is, there may be an output decrease factor (item) or the like which does not shift to the control to increase the refrigerant flow rate or the control to decrease the target temperature of the refrigerant.

In the above embodiment, the output decrease amount is used as an index indicating the degree of deterioration due to each factor such as the factors $\alpha$, $\beta$, and $\gamma$, but the present invention is not limited thereto. For example, an amount of carbon loss may be used as an index indicating a degree of deterioration caused by carbon. That is, in this case, predetermined control may be executed when the amount of carbon loss reaches a predetermined threshold value. Thus, an index set for each factor (that is, individual) may be used as an index indicating the degree of deterioration due to each factor.

For example, when the rated output of the fuel cell stack 12 is equal to or smaller than a predetermined threshold value, or when the output decrease amount due to any one of the output decrease factors is equal to or larger than a predetermined threshold value, the control device 200 may notify a user of the fact, and may receive from the user an operation of selecting whether to execute the control to increase the refrigerant flow rate or the control to decrease the target temperature of the refrigerant. The control device 200 may execute control to increase the refrigerant flow rate or control to decrease the target temperature of the refrigerant on condition that an operation to execute the control is received from the user. Accordingly, it is possible to avoid executing the control to increase the refrigerant flow rate or the control to decrease the target temperature of the refrigerant against an intention of the user. For example, when the control device 200 and a terminal device (for example, a smartphone) of the user can communicate with each other, the control device 200 may make the notification described above or the like via the terminal device of the user. Further, for example, the control device 200 may download a program, data, or the like necessary for executing the control to increase the refrigerant flow rate or the control to decrease the target temperature of the refrigerant from a server device capable of communicating with the control device 200 based on reception of an operation to execute the control from the user.

In the above embodiment, an example in which the information processing device according to the present invention is implemented by the control device 200 in the vehicle 100 is described, but the present invention is not limited thereto. For example, some or all of the functional units which are the acquisition unit 210, the prediction unit 220, the control unit 230, the derivation unit 240, and the factor-specific output decrease amount estimation unit 250 of the control device 200 may be implemented by a server device capable of communicating with the control device 200. That is, the information processing device according to the present invention may be implemented by a server device capable of communicating with the control device 200 in the vehicle 100. The server device may be a virtual server (cloud server) implemented in a cloud computing service, or may be a physical server implemented as a single device.

Further, the information processing device according to the present invention is not limited to be in the vehicle 100, and can be applied to any fuel cell system including a fuel cell. Here, the fuel cell system can be, for example, a stationary residential power supply system including a fuel cell such as the fuel cell stack 12, which is referred to as a "residential fuel cell cogeneration system". When the present invention is applied to such a fuel cell system, the acquisition unit 210 in the control device 200 as an example of the information processing device may acquire use history information indicating a use history of the vehicle for a plurality of items related to an output decrease of the fuel cell system. The derivation unit 240 may derive an output decrease amount for each item based on the use history information acquired by the acquisition unit 210 and output decrease characteristic information indicating an output decrease characteristic of the fuel cell system for each item. The factor-specific output decrease amount estimation unit 250 may estimate an output decrease amount for each of output decrease factors based on the output decrease amount for each item derived by the derivation unit 240 and output decrease factor information indicating an output decrease factor of the fuel cell system for each item. Based on the output decrease amount for each of the output decrease factors estimated by the factor-specific output decrease amount estimation unit 250, the control unit 230 may execute control to increase a flow rate of a pump for supplying the refrigerant to the fuel cell system when any one of the output decrease amounts for each of the output decrease factors is equal to or larger than the threshold value, compared with when all of the output decrease amounts for each of the output decrease factors are less than the threshold value. In this way, when the information processing device according to the present invention is applied to any fuel cell system including a fuel cell, in response to an increase in the output decrease amount due to any one of the output decrease factors, more refrigerants are supplied to the fuel cell, so that it is possible to ensure an output of the fuel cell while reducing a temperature increase in the fuel cell which leads to deterioration. Until the output decrease amount due to any one of the output decrease factors becomes equal to or larger than the threshold value, energy required for driving the pump can be reduced by reducing the flow rate of the pump.

For example, when the present invention is applied to a fuel cell system such as a stationary residential power supply system, the control unit 230 in the control device 200, which is an example of the information processing device, may execute control to decrease the target temperature of the refrigerant used for control of the cooling device in which the refrigerant circulates, instead of the control to increase the flow rate of the pump when any one of the output decrease amounts for each of the output decrease factors is equal to or larger than the threshold value, compared with when all of the output decrease amounts for each of the output decrease factors are less than the threshold value. In this way, when the information processing device according to the present invention is applied to any fuel cell system including a fuel cell, the temperature of the refrigerant supplied to the fuel cell (that is, a temperature of the fuel cell) can be decreased when any one of output decrease amounts for each of the output decrease factors is equal to or larger than a threshold value, compared with when all of the output decrease amounts for each of the output decrease factors are less than the threshold value, and the output of the fuel cell can be ensured while reducing a temperature increase in the fuel cell which leads to deterioration.

In the present specification, at least the following matters are described. Although corresponding constituent elements and the like in the above embodiment are shown in parentheses, the present invention is not limited thereto.

(1) An information processing device (control device 200) for predicting an output decrease amount of a fuel cell (fuel cell stack 12) in a vehicle (vehicle 100) including the fuel cell and a drive source (travel motor Mt) driven by electric power of the fuel cell, the information processing device including:

an acquisition unit (acquisition unit 210) configured to acquire use history information indicating a use history of the vehicle for a plurality of items related to an output decrease of the fuel cell.

a derivation unit (derivation unit 240) configured to derive the output decrease amount for each of the items based on use history information acquired by the acquisition unit and output decrease characteristic information indicating an output decrease characteristic of the fuel cell for each of the items;

a factor-specific output decrease amount estimation unit (factor-specific output decrease amount estimation unit 250) configured to estimate the output decrease amount for each of output decrease factors based on the output decrease amount for each of the items derived by the derivation unit and output decrease factor information (output decrease factor information T) indicating an output decrease factor of the fuel cell for each of the items; and a control unit (control unit 230) configured to execute predetermined control based on the output decrease amount for each of the output decrease factors estimated by the factor-specific output decrease amount estimation unit, in which the control unit executes control to increase a flow rate of a pump (refrigerant pump 90) for supplying a refrigerant to the fuel cell when any one of output decrease amounts for each of the output decrease factors is equal to or larger than a threshold value, compared with when all of the output decrease amounts for each of the output decrease factors are less than the threshold value.

According to (1), when the output decrease amount due to any one of the output decrease factors is equal to or larger than the threshold value, the flow rate of the pump for supplying the refrigerant to the fuel cell can be increased. Accordingly, more refrigerants are supplied to the fuel cell in response to an increase in the output decrease amount due to any one of the output decrease factors, so that it is possible to ensure an output of the fuel cell while reducing the temperature increase in the fuel cell which leads to deterioration. Until the output decrease amount due to any one of the output decrease factors becomes equal to or larger than the threshold value, energy required for driving the pump can be reduced by reducing the flow rate of the pump.

(2) The information processing device according to (1), in which
the control to increase the flow rate is control to increase a flow rate of the pump during high-load power generation of the fuel cell.

The fuel cell tends to have a high temperature during the high-load power generation. According to (2), by increasing the flow rate of the pump during the high-load power generation of the fuel cell, it is possible to avoid the fuel cell from reaching a high temperature while reducing the energy required for driving the pump.

(3) The information processing device according to (1), in which
the control to increase the flow rate is control to increase a flow rate of the pump during each of low-load power generation and high-load power generation of the fuel cell.

According to (3), by increasing the flow rate of the pump during each of the low-load power generation and the high-load power generation of the fuel cell, a temperature increase during the power generation of the fuel cell can be reduced, and deterioration of the fuel cell can be reduced.

(4) The information processing device according to (1), in which
the control to increase the flow rate includes:
first control to increase a flow rate of the pump during high-load power generation of the fuel cell; and
second control to increase a flow rate of the pump during each of low-load power generation and high-load power generation of the fuel cell,
the control unit executes the first control when any one of the output decrease amounts for each of the output decrease factors is equal to or larger than a first threshold value (fourth threshold value Th11, fourth threshold value Th21, fourth threshold value Th31), and
the control unit executes the second control when any one of the output decrease amounts for each of the output decrease factors is equal to or larger than a second threshold value (fifth threshold value Th12, fifth threshold value Th22, fifth threshold value Th32) which is larger than the first threshold value.

According to (4), when the output decrease amount due to any one of the output decrease factors is equal to or larger than the first threshold value, by increasing the flow rate of the pump during high-load power generation of the fuel cell, it is possible to avoid the fuel cell from reaching a high temperature while reducing the energy required for driving the pump. On the other hand, when the output decrease amount due to any one of the output decrease factors is equal to or larger than the second threshold value, by increasing the flow rate of the pump during each of the low-load power generation and the high-load power generation of the fuel cell, the temperature increase during the power generation of the fuel cell can be reduced, and the deterioration of the fuel cell can be reduced. Therefore, appropriate control according to a degree of deterioration of the fuel cell can be executed.

(5) The information processing device according to (4), in which
the control unit executes third control to decrease a target temperature of the refrigerant used for control of a cooling device in which the refrigerant circulates when any one of the output decrease amounts for each of the output decrease factors is equal to or larger than a third threshold value (sixth threshold value Th6) which is larger than the second threshold value, compared with when all of the output decrease amounts for each of the output decrease factors are less than the third threshold value.

According to (5), when the output decrease amount due to any one of the output decrease factors is equal to or larger than the third threshold value, the temperature of the refrigerant supplied to the fuel cell (that is, the temperature of the fuel cell) can be decreased, and deterioration of the fuel cell can be further reduced.

(6) The information processing device according to any one of (1) to (5), in which the control unit further executes control to increase the flow rate of the pump when the control unit determines that a rated output of the fuel cell becomes equal to or smaller than a threshold value based on the output decrease amount for each of the output decrease factors, compared with before the rated output becomes equal to or smaller than the threshold value.

According to (6), the flow rate of the pump for supplying the refrigerant to the fuel cell can be increased when the rated output of the fuel cell becomes equal to or smaller than the threshold value, compared with before the rated output becomes equal to or smaller than the threshold value. Accordingly, after the rated output becomes equal to or smaller than the threshold value, more refrigerants are supplied to the fuel cell, so that it is possible to ensure an output of the fuel cell while reducing the temperature increase in the fuel cell which leads to deterioration. Until the rated output of the fuel cell becomes equal to or smaller than the threshold value, the energy required for driving the pump can be reduced by reducing the flow rate of the pump.

(7) An information processing device for predicting an output decrease amount of a fuel cell in a vehicle including the fuel cell and a drive source driven by electric power of the fuel cell, the information processing device including:

an acquisition unit configured to acquire use history information indicating a use history of the vehicle for a plurality of items related to an output decrease of the fuel cell;

a derivation unit configured to derive the output decrease amount for each of the items based on use history information acquired by the acquisition unit and output decrease characteristic information indicating an output decrease characteristic of the fuel cell for each of the items;

a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items; and a control unit configured to execute predetermined control based on the output decrease amount for each of the output decrease factors estimated by the factor-specific output decrease amount estimation unit, in which the control unit executes control to decrease a target temperature of the refrigerant that cools the fuel cell used for control of a cooling device in which the refrigerant circulates when any one of the output decrease amounts for each of the output decrease factors is equal to or larger than a threshold value, compared with when all of the output decrease amounts for each of the output decrease factors are less than the threshold value.

According to (7), the temperature of the refrigerant supplied to the fuel cell (that is, the temperature of the fuel cell) can be decreased in response to the output decrease amount due to any one of the output decrease factors becoming equal to or larger than the threshold value, and the output of the fuel cell can be ensured while reducing the temperature increase in the fuel cell which leads to deterioration.

(8) The information processing device according to (7), in which the control unit further executes control to decrease the target temperature when the control unit determines that a rated output of the fuel cell becomes equal to or smaller than a threshold value based on the output decrease amount for each of the output decrease factors, compared with before the rated output becomes equal to or smaller than the threshold value.

According to (8), the temperature of the refrigerant supplied to the fuel cell (that is, the temperature of the fuel cell) can be decreased in response to the rated output of the fuel cell becoming equal to or smaller than the threshold value, and the output of the fuel cell can be ensured while reducing a temperature increase in the fuel cell which leads to deterioration.

(9) The information processing device according to any one of (5). (7), and (8), in which the control unit further executes control to decrease humidity in the fuel cell when the target temperature is decreased, compared with before the target temperature is decreased.

According to (9), when the target temperature of the refrigerant is decreased, by decreasing the humidity in the fuel cell, power generation by the fuel cell can be efficiently performed even after the temperature of the refrigerant (that is, the temperature of the fuel cell) is decreased.

(10) A vehicle including:

the information processing device according to any one of (1) to (9);

the fuel cell; and the drive source.

According to (10), it is possible to ensure the output of the fuel cell while reducing the temperature increase in the fuel cell which leads to deterioration in response to the output decrease amount due to any one of the output decrease factors becoming equal to or larger than the threshold value. Accordingly, even after the rated output of the fuel cell decreases to a certain degree, the output of the fuel cell can be ensured while reducing deterioration of the fuel cell, and a driving force of the drive source of the vehicle can also be ensured.

(11) An information processing device for predicting an output decrease amount of a fuel cell in a fuel cell system including the fuel cell, the information processing device including:

an acquisition unit configured to acquire use history information indicating a use history of the fuel cell system for a plurality of items related to an output decrease of the fuel cell;

a derivation unit configured to derive the output decrease amount for each of the items based on use history information acquired by the acquisition unit and output decrease characteristic information indicating an output decrease characteristic of the fuel cell for each of the items;

a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items; and a control unit configured to execute predetermined processing based on the output decrease amount for each of the output decrease factors estimated by the factor-specific output decrease amount estimation unit, in which the control unit executes control to increase a flow rate of a pump for supplying a refrigerant to the fuel cell when any one of the output decrease amounts for each of the output decrease factors is equal to or larger than a threshold value, compared with when all of the output decrease amounts for each of the output decrease factors are less than the threshold value.

According to (11), when the output decrease amount due to any one of the output decrease factors is equal to or larger than the threshold value, the flow rate of the pump for supplying the refrigerant to the fuel cell can be increased. Accordingly, more refrigerants are supplied to the fuel cell in response to an increase in the output decrease amount due to any one of the output decrease factors, so that it is possible to ensure an output of the fuel cell while reducing the temperature increase in the fuel cell which leads to deterioration. Until the output decrease amount due to any one of the output decrease factors becomes equal to or larger than the threshold value, energy required for driving the pump can be reduced by reducing the flow rate of the pump.

(12) An information processing device for predicting an output decrease amount of a fuel cell in a fuel cell system including the fuel cell, the information processing device including:

an acquisition unit configured to acquire use history information indicating a use history of the fuel cell system for a plurality of items related to an output decrease of the fuel cell;

a derivation unit configured to derive the output decrease amount for each of the items based on use history information acquired by the acquisition unit and output decrease characteristic information indicating an output decrease characteristic of the fuel cell for each of the items;

a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items; and a control unit configured to execute predetermined processing based on the output decrease amount for each of the output decrease factors estimated by the factor-specific output decrease amount estimation unit, in which the control unit executes control to decrease a target temperature of the refrigerant that cools the fuel cell used for control of a cooling device in which the refrigerant circulates when any one of the output decrease amounts for each of the output decrease factors is equal to or larger than a threshold value, compared with when all of the output decrease amounts for each of the output decrease factors are less than the threshold value.

According to (12), the temperature of the refrigerant supplied to the fuel cell (that is, the temperature of the fuel cell) can be decreased in response to the output decrease amount due to any one of the output decrease factors becoming equal to or larger than the threshold value, and the output of the fuel cell can be ensured while reducing temperature increase in the fuel cell which leads to deterioration.

What is claimed is:

1. An information processing device for predicting an output decrease amount of a fuel cell in a vehicle including the fuel cell and a drive source driven by electric power of the fuel cell, the information processing device comprising:

circuitry configured to acquire use history information indicating a use history of the vehicle for a plurality of items related to an output decrease of the fuel cell, the plurality of items including at least one of a number of times of starts of the fuel cell, a number of times of power generation of the fuel cell, a number of times of fluctuations in an output voltage, a travel time of the vehicle, and a stop time of the vehicle;

derive the output decrease amount for each of the items based on the acquired use history information and output information indicating a characteristic of an output decrease of the fuel cell for each of the items;

estimate the output decrease amount for each of factors of an output decrease based on the derived output decrease amount for each of the items and output decrease factor information indicating a factor of an output decrease of the fuel cell for each of the items; and execute predetermined control based on the estimated output decrease amount for each of the output decrease factors, wherein the circuitry is configured to execute control to increase a flow rate of a pump for supplying a refrigerant to the fuel cell when any one of output decrease amounts for each of the output decrease factors is equal to or larger than a threshold value, compared with when all of the output decrease amounts for each of the output decrease factors are less than the threshold value.

2. The information processing device according to claim 1, wherein the control to increase the flow rate is control to increase a flow rate of the pump during high-load power generation of the fuel cell.

3. The information processing device according to claim 1, wherein the control to increase the flow rate is control to increase a flow rate of the pump during each of low-load power generation and high-load power generation of the fuel cell.

4. The information processing device according to claim 1, wherein the control to increase the flow rate includes:

first control to increase a flow rate of the pump during high-load power generation of the fuel cell; and second control to increase a flow rate of the pump during each of low-load power generation and high-load power generation of the fuel cell, the circuitry is configured to execute the first control when any one of the output decrease amounts for each of the output decrease factors is equal to or larger than a first threshold value, and the circuitry is configured to execute the second control when any one of the output decrease amounts for each of the output decrease factors is equal to or larger than a second threshold value which is larger than the first threshold value.

5. The information processing device according to claim 4, wherein the circuitry is configured to execute third control to decrease a target temperature of the refrigerant used for control of a cooling device in which the refrigerant circulates when any one of the output decrease amounts for each of the output decrease factors is equal to or larger than a third threshold value which is larger than the second threshold value, compared with when all of the output decrease amounts for each of the output decrease factors are less than the third threshold value.

6. The information processing device according to claim 1, wherein
the circuitry is further configured to execute control to increase the flow rate of the pump when the circuitry determines that a rated output of the fuel cell becomes equal to or smaller than a threshold value based on the output decrease amount for each of the output decrease factors, compared with before the rated output becomes equal to or smaller than the threshold value.

7. An information processing device for predicting an output decrease amount of a fuel cell in a vehicle including the fuel cell and a drive source driven by electric power of the fuel cell, the information processing device comprising:
circuitry configured to
acquire use history information indicating a use history of the vehicle for a plurality of items related to an output decrease of the fuel cell, the plurality of items including at least one of a number of times of starts of the fuel cell, a number of times of power generation of the fuel cell, a number of times of fluctuations in an output voltage, a travel time of the vehicle, and a stop time of the vehicle;
derive the output decrease amount for each of the items based on the acquired use history information and output information indicating a characteristic of an output decrease of the fuel cell for each of the items;
estimate the output decrease amount for each of factors of an output decrease based on the derived output decrease amount for each of the items and output decrease factor information indicating a factor of an output decrease of the fuel cell for each of the items; and
execute predetermined control based on the estimated output decrease amount for each of the output decrease factors, wherein
the circuitry is configured to execute control to decrease a target temperature of a refrigerant that cools the fuel cell used for control of a cooling device in which the refrigerant circulates when any one of the output decrease amounts for each of the output decrease factors is equal to or larger than a threshold value, compared with when all of the output decrease amounts for each of the output decrease factors are less than the threshold value.

8. The information processing device according to claim 7, wherein
the circuitry is further configured to execute control to decrease the target temperature when the circuitry determines that a rated output of the fuel cell becomes equal to or smaller than a threshold value based on the output decrease amount for each of the output decrease factors, compared with before the rated output becomes equal to or smaller than the threshold value.

9. The information processing device according to claim 5, wherein
the circuitry is further configured to execute control to decrease humidity in the fuel cell when the target temperature is decreased, compared with before the target temperature is decreased.

10. A vehicle comprising:
the information processing device according to claim 1;

the fuel cell; and
the drive source.

11. An information processing device for predicting an output decrease amount of a fuel cell in a fuel cell system including the fuel cell, the information processing device comprising:
circuitry configured to
acquire use history information indicating a use history of the fuel cell system for a plurality of items related to an output decrease of the fuel cell, the plurality of items including at least one of a number of times of starts of the fuel cell, a number of times of power generation of the fuel cell, a number of times of fluctuations in an output voltage, a travel time of a vehicle, and a stop time of the vehicle;
derive the output decrease amount for each of the items based on the acquired use history information and output information indicating a characteristic of an output decrease of the fuel cell for each of the items;
estimate the output decrease amount for each of factors of an output decrease based on the derived output decrease amount for each of the items and output decrease factor information indicating a factor of an output decrease of the fuel cell for each of the items; and
execute predetermined processing based on the estimated output decrease amount for each of the output decrease factors, wherein
the circuitry is configured to execute control to increase a flow rate of a pump for supplying a refrigerant to the fuel cell when any one of the output decrease amounts for each of the output decrease factors is equal to or larger than a threshold value, compared with when all of the output decrease amounts for each of the output decrease factors are less than the threshold value.

12. An information processing device for predicting an output decrease amount of a fuel cell in a fuel cell system including the fuel cell, the information processing device comprising:
circuitry configured to
acquire use history information indicating a use history of the fuel cell system for a plurality of items related to an output decrease of the fuel cell, the plurality of items including at least one of a number of times of starts of the fuel cell, a number of times of power generation of the fuel cell, a number of times of fluctuations in an output voltage, a travel time of a vehicle, and a stop time of the vehicle;
derive the output decrease amount for each of the items based on the acquired use history information and output information indicating a characteristic of an output decrease of the fuel cell for each of the items;
estimate the output decrease amount for each of factors of an output decrease factors based on the derived output decrease amount for each of the items and output decrease factor information indicating a factor of an output decrease of the fuel cell for each of the items; and
execute predetermined processing based on the estimated output decrease amount for each of the output decrease factors, wherein
the circuitry is configured to execute control to decrease a target temperature of a refrigerant that cools the fuel cell used for control of a cooling device in which the refrigerant circulates when any one of the output decrease amounts for each of the output decrease factors is equal to or larger than a threshold value, compared with when all of the output decrease amounts for each of the output decrease factors are less than the threshold value.

* * * * *